(12) United States Patent
Chen

(10) Patent No.: US 12,360,337 B2
(45) Date of Patent: Jul. 15, 2025

(54) OPTICAL IMAGING MODULE AND DEVICE AND ELECTRONIC DEVICE

(71) Applicant: BEIJING XIAOMI MOBILE SOFTWARE CO., LTD, Beijing (CN)

(72) Inventor: Yonghua Chen, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 600 days.

(21) Appl. No.: 17/705,173

(22) Filed: Mar. 25, 2022

(65) Prior Publication Data

US 2022/0365313 A1 Nov. 17, 2022

(30) Foreign Application Priority Data

May 14, 2021 (CN) .......................... 202110526945.7

(51) Int. Cl.
*G02B 9/04* (2006.01)
*G02B 5/00* (2006.01)
*G02B 9/00* (2006.01)

(52) U.S. Cl.
CPC .............. *G02B 9/04* (2013.01); *G02B 5/005* (2013.01)

(58) Field of Classification Search
CPC .............. G02B 13/0045; G02B 13/18; G02B 15/1421; G02B 9/04; G02B 13/009
USPC .......................................................... 359/793
See application file for complete search history.

(56) References Cited

U.S. PATENT DOCUMENTS 8,659,838 B2 * 2/2014 Konishi ................ G02B 13/02
359/764
8,885,270 B2 * 11/2014 Tanaka ............... G02B 13/0045
359/716
8,917,457 B2 * 12/2014 Matsusaka ......... G02B 13/0045
359/740

(Continued)

FOREIGN PATENT DOCUMENTS

JP 2012008264 A 1/2012
JP 2012155223 A 8/2012
JP 2020071438 A 5/2020

OTHER PUBLICATIONS

Gross et al. "Handbook of Optical Systems vol. 3: Aberration Theory and Correction of Optical Systems" Weinheim Germany, WILEY-VCH Verlag GmbH & Co. KGaA, pp. 377-379 (Year: 2007).*

(Continued)

*Primary Examiner* — Pinping Sun
*Assistant Examiner* — Alaina Marie Swanson
(74) *Attorney, Agent, or Firm* — Arch & Lake LLP; Shen Wang; Hao Tan

(57) ABSTRACT

The present disclosure provides an optical imaging module, an optical imaging device and an electronic device. The optical imaging module includes a first lens group and a second lens group arranged in sequence from an object side to an imaging surface. The first lens group has a positive refractive power, and includes a first lens having a positive refractive power and a second lens having a negative refractive power arranged in sequence from the object side to the imaging surface. The first lens includes a convex object-side surface and a convex image-side surface. The second lens group includes a plurality of lenses with refractive power, and the plurality of lenses with refractive power include at least one movable lens configured to focus on objects to be (Continued)

photographed at different distances by moving along the optical axis.

17 Claims, 12 Drawing Sheets

(56) References Cited

U.S. PATENT DOCUMENTS

| | | | |
|---|---|---|---|
| 9,465,202 B2 * | 10/2016 | Suzuki | ................... G02B 13/04 |
| 2011/0317281 A1 | 12/2011 | Take | |
| 2015/0241659 A1 | 8/2015 | Huang | |
| 2019/0079268 A1 * | 3/2019 | Suzuki | ............... G02B 13/0045 |
| 2021/0033819 A1 | 2/2021 | Lv et al. | |

OTHER PUBLICATIONS

Partial EP Search Report issued to EP Application No. 22164681.3 dated Aug. 29, 2022, (15p).
INOA of Application No. 202244018916 dated on Feb. 8, 2023 with English translation,(6p).
JPOA of Application No. 2022-048720 dated on Apr. 18, 2023 with English translation,(10p).
Korean Intellectual Property Office, "Request for the Submission of an Opinion" issued in Application No. 10-2022-0033166 dated Mar. 17, 2022 with English Translation, (15p).

* cited by examiner

OPTICAL IMAGING MODULE AND DEVICE AND ELECTRONIC DEVICE

CROSS-REFERENCE TO RELATED APPLICATIONS

This application claims priority to Chinese Patent Application No. 202110526945.7, filed on May 14, 2021, the entire content of which is incorporated herein by reference for all purposes.

TECHNICAL FIELD

The present disclosure generally relates to the field of electronic technology, and more particularly, to an optical imaging module, an optical imaging device and an electronic device.

BACKGROUND

In the related art, an optical imaging module may be disposed in a camera module, and the camera module may be installed on an electronic device to provide a shooting function for the electronic device. In order to improve the clarity of images, an object to be photographed may be focused through the optical imaging module during use of the electronic device.

At present, focusing on objects at different distances is generally realized by moving all the lens groups (i.e., whole lens groups) or moving a lens group (i.e., a front lens group) close to an object side. However, focusing by moving the front lens group will increase an overall length of the optical imaging module during focusing, which makes the miniaturization of the optical imaging module impossible, while focusing by moving the whole lens groups makes the close-range photographing performance poor.

SUMMARY

Embodiments of the present disclosure seek to solve at least one of the problems existing in the related art to at least some extent.

According to a first aspect of the present disclosure, there is provided an optical imaging module. The optical imaging module includes: a first lens group arranged in a direction of an optical axis, having a positive refractive power and including: a first lens, having a positive refractive power and having a convex object-side surface and a convex image-side surface; and a second lens, having a negative refractive power. Further, the first lens and the second lens are arranged in sequence from an object side to an imaging surface. The optical image module further includes a second lens group arranged in the direction of the optical axis, and including: a plurality of lenses with refractive power, including at least one movable lens configured to focus on objects to be photographed at different distances by moving along the optical axis. Moreover, the first lens group and the second lens group are arranged in sequence from the object side to the imaging surface.

According to a second aspect of the present disclosure, there is provided an optical imaging device including the optical imaging module according to the first aspect, and an image sensor component is disposed at an imaging surface of the optical imaging module.

According to a third aspect of the present disclosure, there is provided an electronic device including the optical imaging device as described in the second aspect.

It is to be understood that both the foregoing general description and the following detailed description are exemplary and explanatory only and are not restrictive of the present disclosure, as claimed.

BRIEF DESCRIPTION OF THE DRAWINGS

The accompanying drawings, which are incorporated in and constitute a part of this specification, illustrate examples consistent with the present disclosure and, together with the description, serve to explain the principles of the present disclosure.

DETAILED DESCRIPTION

Figure 1:
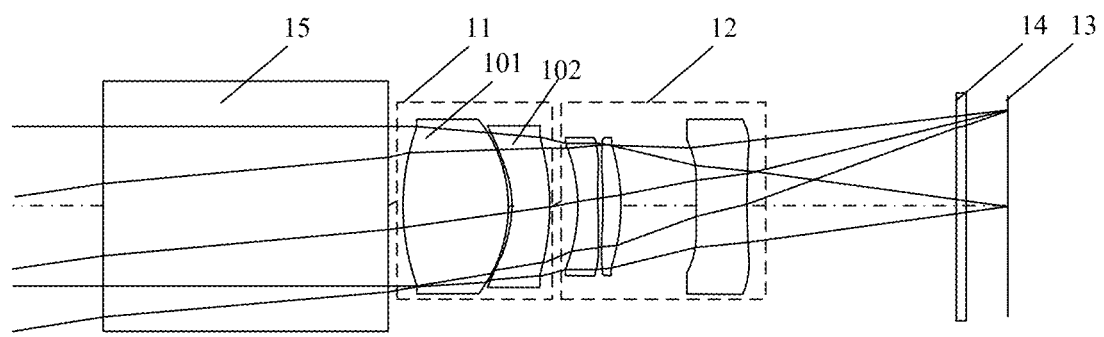
FIG. 1 is a schematic diagram showing an optical imaging module according to an example of the present disclosure.

Reference will now be made in detail to exemplary examples, examples of which are illustrated in the accompanying drawings. The following description refers to the accompanying drawings in which the same numbers in different drawings represent the same or similar elements unless otherwise represented. The implementations set forth in the following description of exemplary examples do not represent all implementations consistent with the invention. Instead, they are merely examples of devices and methods consistent with aspects related to the invention as recited in the appended claims.

Examples of the present disclosure seek to solve at least one of the problems existing in the related art to at least some extent.

The present disclosure provides an optical imaging module, an optical imaging device and an electronic device, which are capable of focusing on objects at different distances by moving a second lens group (i.e., a rear lens group) that is away from an object side, thereby not only miniaturizing the optical imaging module, but also improving the close-range photographing performance of the optical imaging module.

According to a first aspect of examples of the present disclosure, there is provided an optical imaging module, which includes: a first lens group arranged in a direction of an optical axis, having a positive refractive power and including: a first lens, having a positive refractive power and having a convex object-side surface and a convex image-side surface; and a second lens, having a negative refractive power, the first lens and the second lens being arranged in sequence from an object side to an imaging surface. Further, the optical imaging module includes a second lens group arranged in the direction of the optical axis, and including: a plurality of lenses with refractive power, including at least one movable lens configured to focus on objects to be photographed at different distances by moving along the optical axis, and the first lens group and the second lens group are arranged in sequence from the object side to the imaging surface.

In some examples, the optical imaging module further includes: an aperture diaphragm, located between the second lens and the second lens group, and configured to define an aperture of a central chief ray.

In some examples, a relationship between a distance $L_s$ from the aperture diaphragm to the imaging surface and a distance TTL from the first lens to the imaging surface is: $L_s/TTL<0.9$. One or more examples of the ration between $L_s$ and TTL are shown in Table 22. A ratio between $L_s$ and TTL less than 0.9 makes sure that the aperture diaphragm is in a proper location for an optimized optical performance at image margin.

In some examples, the optical imaging module further includes: a field diaphragm, located at an object side of the first lens and configured to limit an incident amount of marginal rays, so as to effectively control an aperture size of the lens at the object side.

In some examples, an Abbe number Vd1 of the first lens is greater than 30; and an Abbe number Vd2 of the second lens is less than 40.

In some examples, a relationship between an overall focal length f of the optical imaging module and a focal length $f_1$ of the first lens is: $2<f/f_1<10$.

In some examples, a relationship between IH that is a half of a diagonal length of an effective sensing area of the imaging surface and a distance TTL from the first lens to the imaging surface is: $2.2<TTL/IH<10$.

In some examples, the second lens group includes a plurality of movable lenses, and a relationship between an overall focal length f of the optical imaging module and a combined focal length $f_m$ of the plurality of movable lenses is: $0.1<|f_m/f|<3$.

In some examples, the plurality of lenses with refractive power include a third lens, a fourth lens and a fifth lens, arranged in sequence from the object side to the imaging surface, and at least one of the third lens, the fourth lens and the fifth lens is movable.

In some examples, the third lens has a negative refractive power and a concave image-side surface; the fourth lens has a positive refractive power, and has a concave object-side surface and a convex image-side surface; and the fifth lens has a negative refractive power and a concave object-side surface.

In some examples, the third lens has a positive refractive power; the fourth lens has a negative refractive power and a concave image-side surface; and the fifth lens has a positive refractive power and a convex object-side surface.

In some examples, a relationship between a focal length $f_1$ of the first lens and a focal length $f_3$ of the third lens is: $1<|f_3/f_1|<5$.

In some examples, a relationship between an overall focal length f of the optical imaging module and a focal length $f_3$ of the third lens is: $0.5<|f/f_3|<3$.

In some examples, a relationship between an overall focal length f of the optical imaging module and a focal length $f_4$ of the fourth lens is: $0<|f/f_4|<6$.

In some examples, a relationship between an overall focal length f of the optical imaging module and a focal length $f_5$ of the fifth lens is: $0<|f/f_5|<5$.

In some examples, a relationship between a radius of curvature $R_1$ of the object-side surface of the first lens and a radius of curvature $R_2$ of the image-side surface of the first lens is: $-5<R_1/R_2<0$.

In some examples, a relationship between a radius of curvature $R_3$ of an object-side surface of the second lens and a radius of curvature $R_4$ of an image-side surface of the second lens is: $-10<(R_3+R_4)/(R_3-R_4)<5$.

In some examples, a relationship between a radius of curvature $R_5$ of an object-side surface of the third lens and a radius of curvature $R_6$ of an image-side surface of the third lens is: $1<f/|R_5|+f/|R_6|<15$, where f is an overall focal length of the optical imaging module.

In some examples, a relationship between a radius of curvature $R_7$ of an object-side surface of the fourth lens and a radius of curvature $R_8$ of an image-side surface of the fourth lens is: $-2<R_7/R_8<10$.

In some examples, a relationship between a distance $T_d$ from a vertex of the object-side surface of the first lens to a vertex of an image-side surface of the fifth lens and a distance TTL from the vertex of the object-side surface of the first lens to the imaging surface is: $0.4<T_d/TTL<1$.

In some examples, the fifth lens has a refractive index N5 less than 1.8.

In some examples, a relationship between the overall focal length f of the optical imaging module and an incident pupil diameter $D_{enp}$ of the optical imaging module is: $f/D_{enp} > 2$.

According to a second aspect of the present disclosure, there is provided an optical imaging device, including the optical imaging module according to the first aspect, and an image sensor component is provided or disposed at an imaging surface of the optical imaging module.

According to a third aspect of the present disclosure, there is provided an electronic device, including the optical imaging device as described in the second aspect.

The technical solutions provided by the examples of the present disclosure may include the following advantageous technical effects.

In the examples of the present disclosure, the focusing of an object to be photographed may be achieved by moving the second lens group (i.e., the rear lens group) that is away from the object side, which makes it possible to miniaturize the imaging module. In addition, the cooperation of the first lens with the positive refractive power and the second lens with the negative refractive power may suppress an overall spherical aberration and coma aberration of the optical imaging module, thereby improving the close-range photographing performance and imaging effects of the optical imaging module.

FIG. 1 is a schematic diagram showing an optical imaging module according to an example of the present disclosure. As shown in FIG. 1, the optical imaging module may include a first lens group 11 and a second lens group 12 arranged in sequence from an object side to an imaging surface in a direction of an optical axis.

The first lens group 11 has a positive refractive power, and includes a first lens 101 having a positive refractive power and a second lens 102 having a negative refractive power, and the first lens 101 and the second lens 102 are arranged in sequence from the object side to the imaging surface. The first lens 101 has a convex object-side surface and a convex image-side surface.

The second lens group 12 includes a plurality of lenses with refractive power, and the plurality of lenses with refractive power include at least one movable lens. The movable lens is configured to focus on objects to be photographed at different distances by moving along the optical axis.

The lenses of the first lens group and the second lens group are arranged at intervals. In some examples, optical centers of the lenses of the first lens group and the second lens group are located on a same straight line, which may form the optical axis of the optical imaging module. In implementation, a distance between any movable lens in the second lens group and a lens adjacent thereto may be changed. That is to say, in examples of the present disclosure, the focusing of objects to be photographed at different distances may be realized by adjusting the distance between any movable lens in the second lens group and the lens adjacent thereto.

In some examples, the at least one movable lens may be driven by a driving component. For example, the driving component may include a guide rail parallel to the optical axis, and the guide rail is slidably connected to the movable lens. The driving component may include a drive motor, such as a linear motor and a rotor motor. In some examples of the present disclosure, by providing the driving component for the movable lens, the movable lens may be driven by the driving component to move, thereby realizing optical zooming of the optical imaging module.

In some examples, the second lens 102 has a concave object-side surface and the negative refractive power, which may correct the aberration caused by the positive refractive power of the first lens 101. In some examples, the image-side surface of the second lens 102 may be concave or convex, which may be determined as required, and is not particularly limited herein.

In some examples, as shown in FIG. 1, the second lens 102 has a concave object-side surface. In some examples of the present disclosure, the object-side surface and the image-side surface of the first lens 101 both are convex, and the object-side surface of the second lens 102 is concave, such that the image-side surface of the first lens 101 may be fit to the object-side surface of the second lens 102, thereby shortening a total length of the optical imaging module, and reducing a spherical aberration and a coma aberration.

In some examples of the present disclosure, by moving the second lens group (i.e., the rear lens group) that is away from the object side, the object to be photographed may be focused, while maintaining the total optical length unchanged during focusing, which makes it easy to miniaturize the optical imaging module. In addition, the cooperation of the first lens with the positive refractive power and the second lens with the negative refractive power may suppress the overall spherical aberration and coma aberration of the optical imaging module, thereby improving the close-range photographing performance and imaging effects of the optical imaging module.

In some examples, the optical imaging module further includes an image sensor 13 disposed at the imaging surface.

In some examples, as shown in FIG. 1, the optical imaging module further includes a filter component 14 located between the image-side surface of the lens groups and the imaging surface. The filter component refers to a component which is able to filter lights in certain wavelength bands, such as an infrared filter.

In some examples, as shown in FIG. 1, the optical imaging module further includes a light deflection component 15. For example, the light deflection component is configured to deflect lights, and may be such as a reflective lens, a right angle prism and the like. By providing the light deflection component, the input lights may be deflected to and incident to the first lens group and the second lens group, so as to meet size requirements of different electronic devices.

In some examples, the optical imaging module may further include an aperture diaphragm. The aperture diaphragm is located between the second lens 102 and the second lens group 12, and configured to define an aperture of a central chief ray during the focusing of the object to be photographed, which may keep a large clear aperture and balance an aperture ratio of upper and lower lights, thereby improving a relative illumination of a margin field.

In some examples, a maximum chief ray angle (CRA) of a central ray incident on the imaging surface is less than a preset angle threshold, for example, may be less than 25 degrees. In some examples of the present disclosure, a position of the aperture diaphragm may be adjusted to adapt the CRA of the image sensor, thereby achieving the optimal photoelectric conversion efficiency.

In some examples, a relationship between a distance $L_s$ from the aperture diaphragm to the imaging surface and a distance TTL from the first lens 101 to the imaging surface may be: $L_s/TTL < 0.9$.

In some examples of the present disclosure, by limiting the relationship between the distance $L_s$ from the aperture diaphragm to the imaging surface and the distance TTL from the first lens to the imaging surface, the amount of upper lights that reach the image sensor and the amount of lower lights which reach the image sensor may be balanced, and the aperture of the first lens group (i.e., the front lens group) may be reduced while ensuring a higher relative illumination of the margin field. For example, if the aperture diaphragm is between the imaging surface and a fifth lens, too much upper lights that reach the margin field will be blocked. And, if the aperture diaphragm is even in front of the first lens, too much lower lights that reach the margin field will be blocked. These settings will not lead to a good optical performance at the image margin.

In some examples, the optical imaging module may further include a field diaphragm located at an object side of the first lens 101 and configured to limit an incident amount of marginal rays during focusing of an object to be photographed.

In some examples of the present disclosure, the field diaphragm may be provided at an effective aperture at the object side of the first lens. In some examples of the present disclosure, by arranging the field diaphragm at the object side of the first lens, the field diaphragm is closest to the object side, such that the light needs to pass through the field diaphragm before entering the first lens group and the second lens group.

As the field diaphragm is closest to the object side, and is located at a front end of the optical imaging module, it is unnecessary to increase the sizes of other components while increasing the size of the field diaphragm. In this way, the size of the field diaphragm may be increased as required to increase the amount of incoming lights and a diffraction limitation of lights, without being limited by the size of other components, thereby reducing an adverse influence of stray lights in the margin field on the imaging effect on a basis of reducing the aperture of the first lens.

In some examples, the optical imaging module may further include a light-transmitting cover plate located on a side (i.e., an object side) of the field diaphragm away from the first lens 101.

In some examples, an Abbe number Vd1 of the first lens 101 is greater than 30, and an Abbe number Vd2 of the second lens 102 is less than 40, which, in combination with the positive refractive power of the first lens and the negative refractive power of the second lens, enable the optical imaging module to effectively correct chromatic aberration.

In some examples, a relationship between an overall focal length f of the optical imaging module and a focal length $f_1$ of the first lens may be: $2<f/f_1<10$.

In some examples, if the ratio $f/f_1$ is too large, such as greater than an upper limit (e.g., 10), a focal power of the first lens is too strong, resulting in overlarge spherical aberration and off-axis coma aberration, and making the aberration correction to be difficult.

If the ratio $f/f_1$ is too small, such as lower than a lower limit (e.g., 2), the refractive power of the first lens group is too weak, resulting in an increased total optical length, and making the miniaturization to be difficult. In some examples of the present disclosure, on the basis of the configuration of the refractive power of each lens in the optical imaging module, by controlling the focal length of the first lens within a reasonable range, a balance may be achieved between the reduction of the total optical length and the suppression of the spherical aberration.

In some examples, a relationship between IH that is a half of a diagonal length of an effective sensing area of the imaging surface and a distance TTL from the first lens to the imaging surface may be: $2.2<TTL/IH<10$.

In some examples of the present disclosure, the image sensor is provided or disposed at the imaging surface, and a size of an effective imaging surface of the image sensor is limited within a reasonable range, such that the formed optical imaging module is more suitable for a telephoto optical imaging system.

In some examples, the second lens group includes a plurality of movable lenses, and a relationship between an overall focal length f of the optical imaging module and a combined focal length $f_m$ of the plurality of movable lenses is: $0.1<|f_m/f|<3$.

When focusing on objects to be photographed at different distances from infinity to close range, the first lens group is fixed, and the second lens group 12 or one or more lenses of the second lens group 12 is moved to focus on the objects to be photographed. The focal length of the optical imaging module when focusing at infinity is f, and the combined focal length of the plurality of movable lenses (i.e., a focal length of a focusing lens group) is $f_m$.

In some examples of the present disclosure, the second lens group or one or more lenses of the second lens group may be moved to suppress the increase of aberrations during the focusing and improve the imaging quality at close range, such that good imaging quality may be maintained from infinity to close range. When the value of $|f_m/f|$ is greater than the upper limit, the moving stroke of the focusing lens group is too large, such that an overall space needs to be increased, and the size of the optical imaging module is difficult to miniaturize. When the value of $|f_m/f|$ is lower than the lower limit, the focusing lens group has a large focal power, and the focusing sensitivity is too high, such that the aberration increases sharply during the focusing, which is not conducive to the improvement of imaging performance at close range. In some examples of the present disclosure, controlling the focal length of the focusing lens group within the specified range can balance the moving stroke and the focusing sensitivity of the focusing lens group.

In some examples, the plurality of lenses with refractive power include a third lens, a fourth lens and a fifth lens, arranged in sequence from the object side to the imaging surface, and at least one of the third lens, the fourth lens and the fifth lens is movable.

In some examples of the present disclosure, an object to be photographed may be focused by moving at least one of the third lens, the fourth lens and the fifth lens that are away from the object side, which is conducive to the miniaturization of the optical imaging module. In addition, in some examples of the present disclosure, the cooperation of the first lens with the positive refractive power and the second lens with the negative refractive power may suppress the overall spherical aberration and coma aberration of the optical imaging module, thereby improving the close-range photographing performance and imaging effects of the optical imaging module.

In some examples, the third lens has a negative refractive power and a concave image-side surface. The fourth lens has a positive refractive power, and has a concave object-side surface and a convex image-side surface. The fifth lens has a negative refractive power and a concave object-side surface.

For example, in some examples of the present disclosure, the optical imaging module may include a first lens 101, a second lens 102, a third lens, a fourth lens and a fifth lens.

The first lens 101 has a positive refractive power, and has a convex object-side surface and a convex image-side surface. The second lens 102 has a negative refractive power, and has a concave object-side surface and a convex image-side surface. The third lens has a negative refractive power, and has a concave image-side surface and a concave object-side surface. The fourth lens has a positive refractive power, and has a concave object-side surface and a convex image-side surface. The fifth lens has a negative refractive power, and has a concave object-side surface and a concave image-side surface.

The first lens, the second lens, the third lens, the fourth lens and the fifth lens may also have other structures and shapes, and some possible implementations related thereto will be described below.

In some examples, the first lens, the second lens, the third lens, the fourth lens and the fifth lens may be made of a plastic material or other materials, which is not particularly limited herein.

In some examples, the third lens has a positive refractive power. The fourth lens has a negative refractive power and a concave image-side surface. The fifth lens has a positive refractive power and has a convex object-side surface.

For example, in some examples of the present disclosure, the optical imaging module includes a first lens 101, a second lens 102, a third lens, a fourth lens and a fifth lens. The first lens 101 has a positive refractive power, and has a convex object-side surface and a convex image-side surface. The second lens 102 has a negative refractive power, and has a concave object-side surface and a convex image-side surface. The third lens has a positive refractive power, and has a convex object-side surface and a concave image-side surface. The fourth lens has a negative refractive power, and has a convex object-side surface and a concave image-side surface. The fifth lens has a positive refractive power, and has a convex object-side surface and a convex image-side surface.

The first lens, the second lens, the third lens, the fourth lens and the fifth lens may also have other structures and shapes, and some possible implementations related thereto will be described below.

In some examples, a relationship between a focal length $f_1$ of the first lens and a focal length $f_3$ of the third lens is: $1<|f_3/f_1|<5$.

In some examples, when the value of $|f_3/f_1|$ is greater than the upper limit, the refractive power of the first lens is strong, and the refractive power of the third lens is weak, such that the spherical aberration and an off-axis aberration increase, and it is difficult to achieve a good aberration compensation. When the value of $|f_3/f_1|$ is lower than the lower limit, the focal length of the first lens is large, and the refractive power of the first lens is weak, resulting in a poor chromatic aberration cancellation effect and a poor imaging effect. In some examples of the present disclosure, on the basis of the configuration of the refractive power of each lens in the optical imaging module, by controlling the focal length of the third lens within a reasonable range, a balance may be achieved between the reduction of the total optical length and the suppression of the spherical aberration, and good aberration compensation and good chromatic aberration cancellation effect may be realized.

In some examples, a relationship between an overall focal length f of the optical imaging module and a focal length $f_3$ of the third lens is: $0.5<|f/f_3|<3$.

In some examples of the present disclosure, the focal length of the third lens is close to the aperture diaphragm (aperture). When the third lens has a negative refractive power, and the second lens also has a negative refractive power, the focal power of the second lens will be weakened, which reduces an overall eccentricity sensitivity. When the value of $|f/f_3|$ is greater than the upper limit, the refractive power of the third lens is strong, and the spherical aberration is overcompensated. When the value of $|f/f_3|$ is lower than the lower limit, the refractive power of the third lens is weak, and the compensation ability of the spherical aberration and the off-axis aberration is weakened, the matching relationship with the second lens is worse, and it is difficult to achieve good chromatic aberration cancellation effect.

In some examples of the present disclosure, the optical imaging module not only can achieve good balance between the reduction of the total optical length and the suppression of the spherical aberration, good aberration compensation and good chromatic aberration cancellation effect by controlling the focal length of the third lens within a reasonable range, but also can extend the close-range imaging range, improve the close-range imaging quality, and achieve excellent imaging quality from infinity to close range by moving the second lens group or one or more lenses (e.g., the third lens) of the second lens group.

In some examples, a relationship between an overall focal length f of the optical imaging module and a focal length $f_4$ of the fourth lens is: $0<|f/f_4|<6$.

In some examples of the present disclosure, the focal length of the fourth lens is defined and controlled within a reasonable range, which may reduce sensitivity and optimize the aberration compensation.

In some examples, the relationship between the overall focal length f of the optical imaging module and the focal length $f_4$ of the fourth lens may be: $0<|f/f_4|<5$.

In some examples, a relationship between an overall focal length f of the optical imaging module and a focal length $f_5$ of the fifth lens is: $0<|f/f_5|<5$.

In some examples, when the value of $|f/f_5|$ is greater than the upper limit or lower than the lower limit, it is not conducive to the aberration compensation of the margin field, especially for field curvature and coma aberration.

In some examples of the present disclosure, the focal length of the fifth lens is defined and controlled within a reasonable range, which may optimize the aberration compensation of the margin field, and achieve good chromatic aberration cancellation effect.

In some examples of the present disclosure, the relationship between the overall focal length f of the optical imaging module and the focal length $f_5$ of the fifth lens may be: $0<|f/f_5|<4$.

In some examples, the fifth lens has a refractive index N5 less than 1.8.

In some examples, a relationship between a radius of curvature $R_1$ of the object-side surface of the first lens 101 and a radius of curvature $R_2$ of the image-side surface of the first lens is: $-5<R_1/R_2<0$.

In some examples of the present disclosure, the shape of the first lens 101 is defined, and if the ratio $R_1/R_2$ is beyond the above-mentioned range, it is not conducive to the balance relationship between the spherical aberration compensation and the astigmatism. In examples of the present disclosure, by limiting the ratio $R_1/R_2$ within the above-mentioned range, good aberration compensation and good chromatic aberration cancellation effect are achieved, such that the relationship between the spherical aberration compensation and the astigmatism is more balanced.

In some examples, the relationship between the radius of curvature $R_1$ of the object-side surface of the first lens 101 and the radius of curvature $R_2$ of the image-side surface of the first lens may be: $-4<R_1/R_2<0$.

In some examples, a relationship between a radius of curvature $R_3$ of an object-side surface of the second lens 102 and a radius of curvature $R_4$ of an image-side surface of the second lens is: $-10<(R_3+R_4)/(R_3-R_4)<5$.

In some examples of the present disclosure, the shape of the second lens 102 is defined, and if the value of $(R_3+R_4)/(R_3-R_4)$ is beyond this range, it is not conducive to the balance relationship between the spherical aberration compensation and the astigmatism. In some examples of the present disclosure, by limiting the shape of the second lens within the above-mentioned range, good aberration compensation and good chromatic aberration cancellation effect are achieved, such that the relationship between the spherical aberration compensation and the astigmatism is more balanced.

In some examples, the relationship between the radius of curvature $R_3$ of the object-side surface of the second lens and the radius of curvature $R_4$ of the image-side surface of the second lens may be: $-8<(R_3+R_4)/(R_3-R_4)<3$.

In some examples, a relationship between a radius of curvature $R_5$ of an object-side surface of the third lens and a radius of curvature $R_6$ of an image-side surface of the third lens is: $1<f/|R_5|+f/|R_6|<15$, where f is an overall focal length of the optical imaging module.

In some examples of the present disclosure, the shape of the third lens is defined, and the third lens has a concave image-side surface, which is beneficial to the correction of the field curvature and the coma aberration. If the value of $f/|R_5|+f/|R_6|$ is beyond the above-mentioned range, it is not conducive to the balance compensation of each aberration.

In some examples, a relationship between a radius of curvature $R_7$ of an object-side surface of the fourth lens and a radius of curvature $R_8$ of an image-side surface of the fourth lens is: $-2<R_7/R_8<10$.

In some examples of the present disclosure, the shape of the fourth lens is defined, which is beneficial for the aberration compensation of the margin field. If the ratio $R_7/R_8$ is beyond the above-mentioned range, it is not conducive to the aberration compensation of the margin field.

In some examples of the present disclosure, the relationship between the radius of curvature $R_7$ of the object-side surface of the fourth lens and the radius of curvature $R_8$ of the image-side surface of the fourth lens may be: $-1<R_7/R_8<9$.

In some examples, a relationship between a distance $T_d$ from a vertex of the object-side surface of the first lens 101 to a vertex of the image-side surface of the fifth lens and a distance TTL from the vertex of the object-side surface of the first lens 101 to the imaging surface is: $0.4<T_d/TTL<1$.

In some examples of the present disclosure, the relationship between the distance from the first lens to the imaging surface (i.e., a total length of the lens groups) and the total length of the imaging system is defined. The focusing manner realized by moving the second lens group (i.e., the rear lens group) fully utilizes the total length of the optical imaging module, and enables the optical imaging module to achieve a balance between the reduction of the focusing sensitivity and the shortening of the overall length. The distance between the first lens and the imaging surface is the distance from the vertex of the first lens close to the object side to the imaging surface.

In some examples, a full field of view (FOV) of the optical imaging module may satisfy the following relationship: FOV<60 degrees. In examples of the present disclosure, limiting the field of view to be less than 60 degrees enables the optical imaging module to be more suitable for a medium- or long-focus optical imaging lens.

In some examples, the first lens, the second lens, the third lens, the fourth lens and the fifth lens each may be an aspheric lens. In some examples, the material for each of the first lens, the second lens, the third lens, the fourth lens and the fifth lens may include an optical plastic.

In some examples, a relationship between the overall focal length f of the optical imaging module and an incident pupil diameter $D_{enp}$ of the optical imaging module is: $f/D_{enp}>2$.

In some examples of the present disclosure, the value of $f/D_{enp}$ is the aperture value of the optical imaging module. In examples of the present disclosure, by limiting the aperture value within a reasonable range, such as greater than 2, the amount of lights entering the optical imaging module may be ensured, and at the same time, the size limitation of the optical imaging module may be met.

In some examples, an electronic device is provided, which includes the optical imaging module as described in any examples hereinbefore. In the electronic device, an image sensor is disposed at the imaging surface, other components (such as a motor) may be provided to cooperate with the focusing lens group, and one of the lens groups is used as an anti-shake component.

The present disclosure also provides following examples for the optical imaging module.

Figure 2:
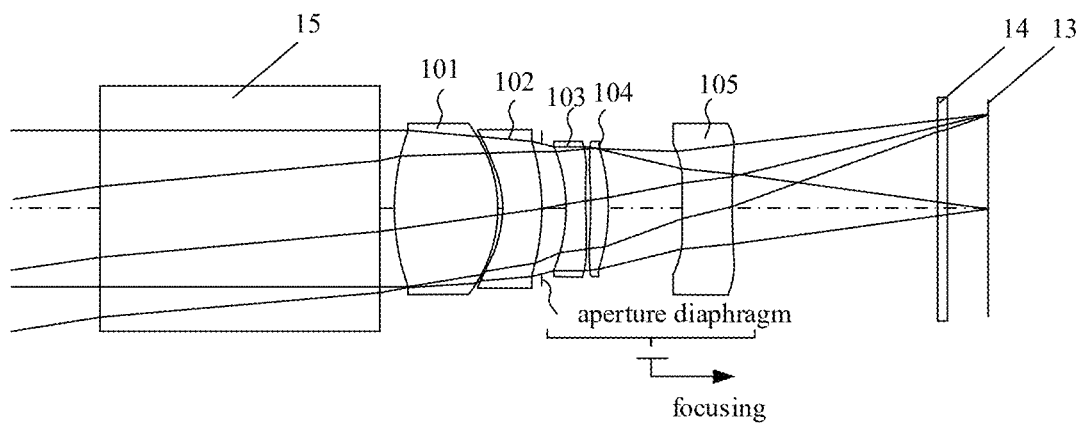
FIG. 2 is a schematic diagram showing an optical imaging module according to an example of the present disclosure.
Figure 3:
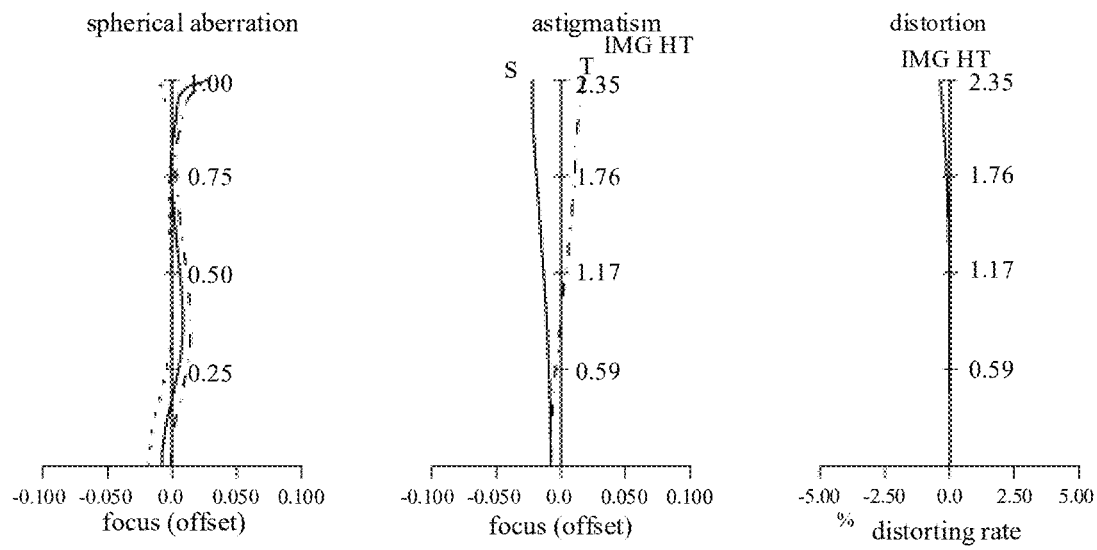
FIG. 3 is a schematic graph showing spherical aberration, astigmatism and distortion curves according to the example as shown in FIG. 2 of the present disclosure.
Figure 4:
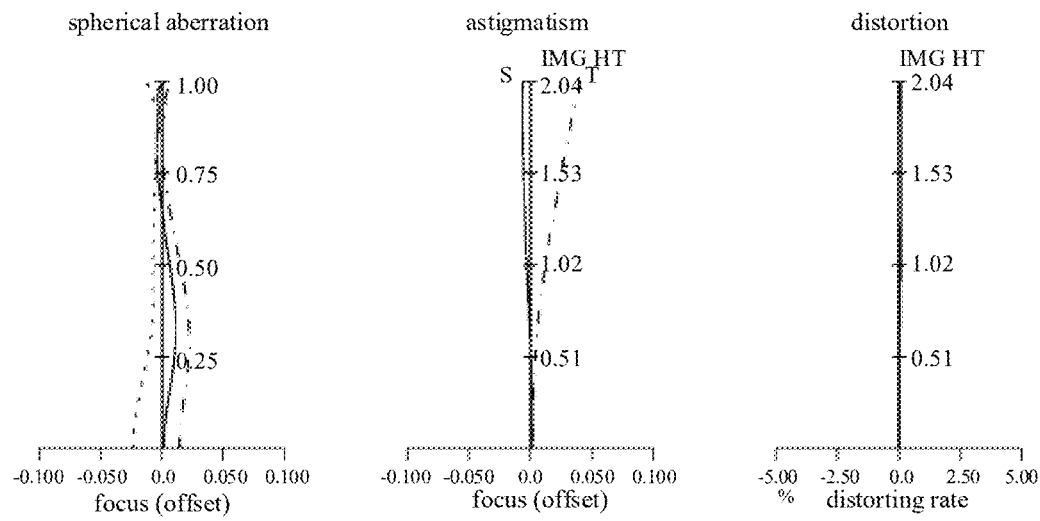
FIG. 4 is a schematic graph showing spherical aberration, astigmatism and distortion curves according to the example as shown in FIG. 2 of the present disclosure.

FIG. 2 is a schematic diagram showing an optical imaging module according to an example of the present disclosure. FIG. 3 is a schematic graph showing, from left to right, a spherical aberration curve, an astigmatism curve and a distortion curve obtained when an object distance is infinite, according to an example of the present disclosure. FIG. 4 is a schematic graph showing, from left to right, a spherical aberration curve, an astigmatism curve and a distortion curve obtained when an object distance is 100 mm, according to an example of the present disclosure. As shown in FIG. 2, the optical imaging module may include a first lens 101, a second lens 102, a third lens 103, a fourth lens 104 and a fifth lens 105.

The first lens 101 has a positive refractive power, and has a convex object-side surface and a convex image-side surface.

The second lens 102 has a negative refractive power, and has a concave object-side surface and a convex image-side surface.

The third lens 103 has a negative refractive power, and has a concave image-side surface and a concave object-side surface.

The fourth lens 104 has a positive refractive power, and has a concave object-side surface and a convex image-side surface.

The fifth lens 105 has a negative refractive power, and has a concave object-side surface and a concave image-side surface.

In some examples, the first lens, the second lens, the third lens, the fourth lens and the fifth lens may be made of a plastic material or other materials, which is not particularly limited herein.

Table 1 shows optical structure data of an optical imaging system according to an example, which corresponds to the optical imaging system shown in FIG. 2.

TABLE 1 optical structure data

| TYPE | f: 11.60 mm S | R | fno: 3.40 thi | HFOV: Nd | 10.0 deg Vd | EFL |
|---|---|---|---|---|---|---|
| flat | OBJ | inf | D0 | | | |
| ASP | 1 | 4.66340 | 2.08 | 1.535 | 55.7 | 3.90 |
| ASP | 2 | −3.18280 | 0.10 | | | |
| ASP | 3 | −2.17660 | 0.78 | 1.614 | 25.6 | −9.80 |
| ASP | 4 | −3.87300 | 0.00 | | | |
| flat | STO | inf | d1 | | | |
| ASP | 6 | −5.14390 | 0.40 | 1.608 | 26.9 | −6.61 |
| ASP | 7 | 18.89720 | 0.10 | | | |
| ASP | 8 | −8.12350 | 0.35 | 1.671 | 19.2 | 8.13 |
| ASP | 9 | −3.31980 | 1.50 | | | |
| ASP | 10 | −3.31980 | 1.00 | 1.584 | 28.2 | −10.21 |
| ASP | 11 | 6.51490 | d2 | | | |
| flat | 12 | inf | 0.21 | 1.517 | 64.20 | — |
| flat | 13 | inf | 0.80 | | | |
| flat | 14 | image | — | | | |

In Table 1, f represents an overall focal length of the optical imaging module; fno represents an aperture value; HFOV represents a half field of view; TYPE represents a surface type; S represents a surface number; R represents a radius of curvature; thi represents a thickness of each lens and an air space between adjacent lenses; Nd represents a refractive index; Vd represents a dispersion coefficient (Abbe number); EFL represents a focal length; OBJ represents an object to be photographed; inf represents infinity; D0 represents a distance from the object to a vertex of the object-side surface of the first lens; ASP represents a aspheric surface; image represents the imaging surface; d1 represents an air space between a focusing lens and a fixed lens closest thereto at the object side; and d2 represents an air space between the focusing lens and a fixed lens closest thereto at the image side.

Table 2 shows aspheric coefficients according to an example, which corresponds to the optical imaging system shown in FIG. 2.

TABLE 2 aspheric coefficients

| surface | K | A | B | C | D | E |
|---|---|---|---|---|---|---|
| 1 | −2.00783E+00 | −9.97843E−04 | 2.15083E−04 | −7.63358E−04 | 2.44866E−04 | −4.41921E−05 |
| 2 | 0.00000E+00 | 1.02439E−03 | 1.71136E−03 | −8.13114E−04 | 1.15285E−04 | −3.01016E−06 |
| 3 | 0.00000E+00 | 3.57603E−02 | 1.81934E−03 | −1.31069E−03 | 3.37717E−04 | 4.28664E−06 |
| 4 | 0.00000E+00 | 2.24832E−02 | 8.20199E−04 | −1.37013E−03 | 3.71402E−04 | −2.34780E−05 |
| 6 | 0.00000E+00 | −2.53428E−02 | 2.78642E−03 | 6.39864E−04 | −7.75290E−05 | −3.87845E−05 |
| 7 | 0.00000E+00 | −1.63155E−02 | −3.37348E−03 | −3.96182E−03 | 1.87261E−03 | −1.63255E−04 |
| 8 | 0.00000E+00 | 3.42490E−02 | −5.35789E−03 | 1.59024E−03 | −2.99467E−04 | 2.32764E−05 |
| 9 | 0.00000E+00 | 2.01661E−02 | 6.24883E−04 | 5.96321E−03 | −1.80794E−03 | 1.30108E−05 |
| 10 | 0.00000E+00 | −4.00136E−02 | −4.05202E−03 | 3.68313E−03 | −2.13238E−03 | 2.93905E−04 |
| 11 | 0.00000E+00 | −3.66706E−02 | 2.59699E−03 | 8.46638E−04 | −5.17546E−04 | 7.33360E−05 |

In Table 2, surface represents a surface number.

Table 3 shows position relationships of the focusing lens according to an example, corresponding to the optical imaging system shown in FIG. 2.

TABLE 3 position relationships of the focusing lens

| | Pos1 | Pos2 |
|---|---|---|
| D0 | inf | 100 |
| d1 | 0.50 | 4.15 |
| d2 | 1.14 | 3.51 |

In Table 3, D0 represents a distance between an object to be photographed and a vertex of the first lens close to the object side; Pos1 represents a position relationship of the focusing lens when focusing on an object at infinity; Pos2 represents a position relationship of front and rear air spaces of the focusing lens when focusing on an object at 100 mm; and inf represents infinity.

Figure 5:
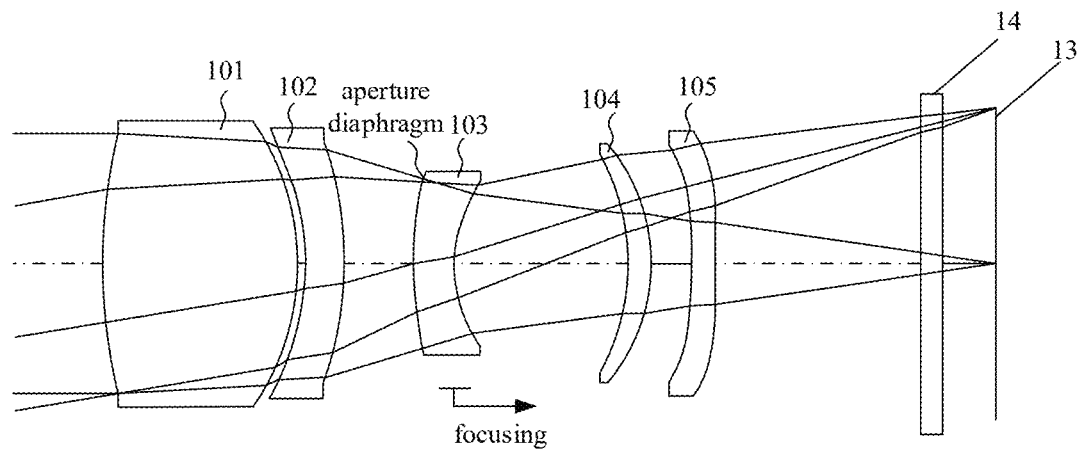
FIG. 5 is a schematic diagram showing an optical imaging module according to another example of the present disclosure.
Figure 6:
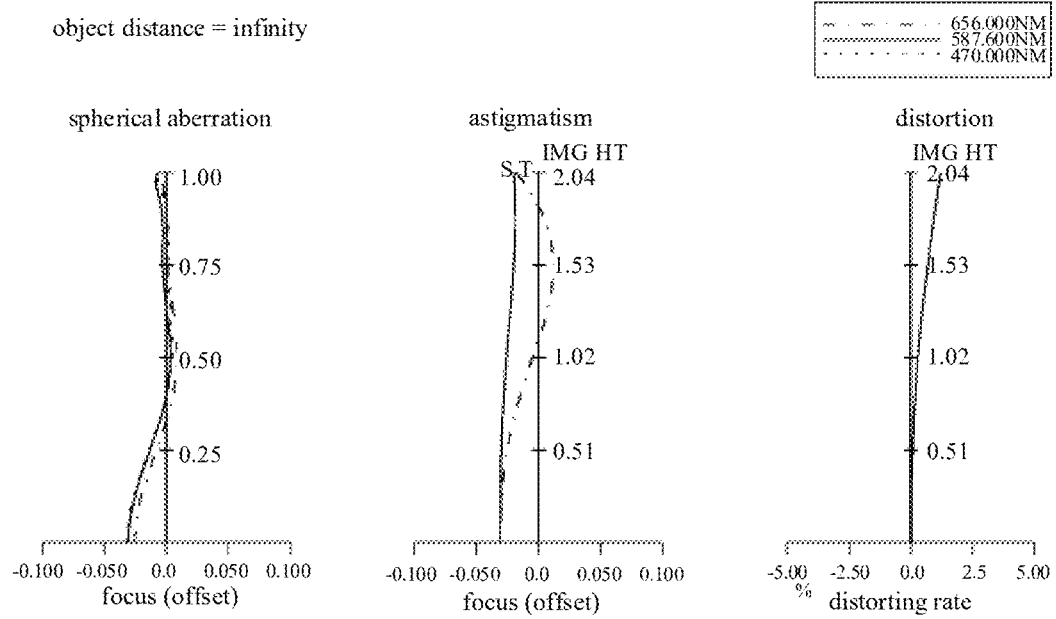
FIG. 6 is a schematic graph showing spherical aberration, astigmatism and distortion curves according to the example as shown in FIG. 5 of the present disclosure.
Figure 7:
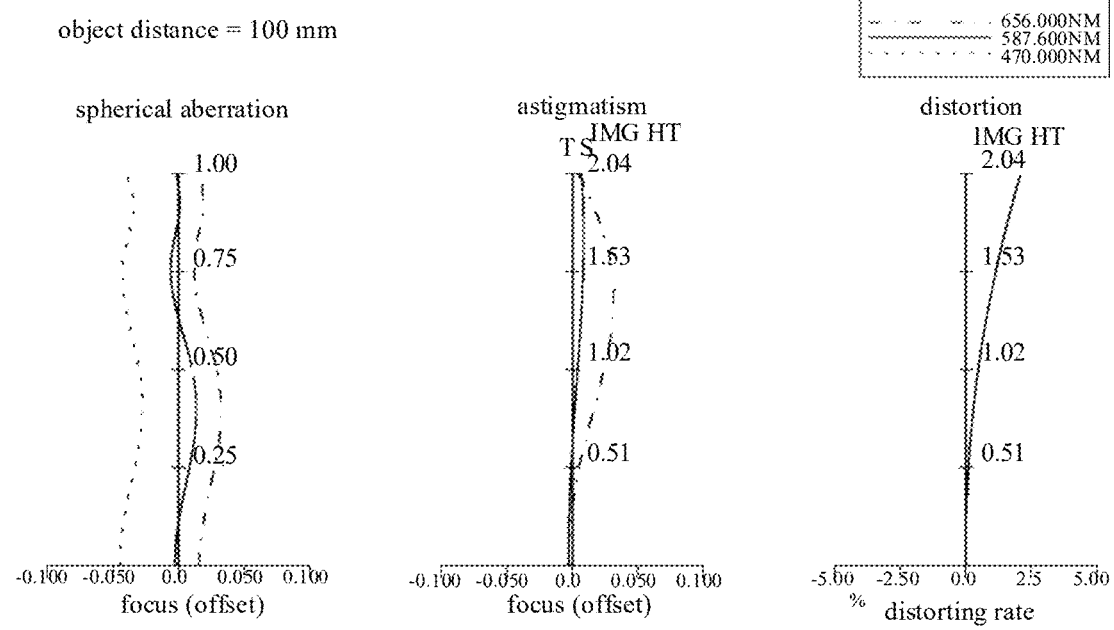
FIG. 7 is a schematic graph showing spherical aberration, astigmatism and distortion curves according to the example as shown in FIG. 5 of the present disclosure.

FIG. 5 is a schematic diagram showing an optical imaging module according to an example of the present disclosure. FIG. 6 is a schematic graph showing, from left to right, a spherical aberration curve, an astigmatism curve and a distortion curve obtained when an object distance is infinite, according to an example of the present disclosure. FIG. 7 is a schematic graph showing, from left to right, a spherical aberration curve, an astigmatism curve and a distortion curve obtained when an object distance is 100 mm, according to an example of the present disclosure. As shown in FIG. 5, the optical imaging module may include a first lens 101, a second lens 102, a third lens 103, a fourth lens 104 and a fifth lens 105.

The first lens 101 has a positive refractive power, and has a convex object-side surface and a convex image-side surface.

The second lens 102 has a negative refractive power, and has a concave object-side surface and a convex image-side surface.

The third lens 103 has a negative refractive power, and has a convex object-side surface and a concave image-side surface.

The fourth lens 104 has a positive refractive power, and has a concave object-side surface and a convex image-side surface.

The fifth lens 105 has a negative refractive power, and has a concave object-side surface and a concave image-side surface.

In some examples, the first lens, the second lens, the third lens, the fourth lens and the fifth lens may be made of a plastic material or other materials, which is not particularly limited herein.

Table 4 shows optical structure data of an optical imaging system according to an example, which corresponds to the optical imaging system shown in FIG. 5.

TABLE 4 optical structure data

| TYPE | f: 11.54 mm S | R | fno: 3.38 thi | FOV: Nd | 9.9 deg Vd | EFL |
|---|---|---|---|---|---|---|
| flat | OBJ | inf | D0 | | | |
| ASP | 1 | 5.94170 | 2.55 | 1.535 | 55.7 | 4.41 |
| ASP | 2 | −3.32380 | 0.11 | | | |

TABLE 4-continued optical structure data

| TYPE | f: 11.54 mm<br>S | R | fno: 3.38<br>thi | Nd | FOV: 9.9 deg<br>Vd | EFL |
|---|---|---|---|---|---|---|
| ASP | 3 | −3.19230 | 0.50 | 1.614 | 25.6 | −20.61 |
| ASP | 4 | −4.52300 | 0.10 | | | |
| flat | STO | inf | d1 | | | |
| ASP | 6 | 4.33790 | 0.54 | 1.614 | 25.6 | −5.38 |
| ASP | 7 | 1.78590 | d2 | | | |
| ASP | 8 | −2.95600 | 0.31 | 1.671 | 19.2 | 14.88 |
| ASP | 9 | −2.37600 | 0.52 | | | |
| ASP | 10 | −16.73200 | 0.32 | 1.544 | 56.0 | −25.29 |
| ASP | 11 | 77.92170 | 2.67 | | | |
| flat | 12 | inf | 0.31 | 1.517 | 64.20 | — |
| flat | 13 | inf | 0.69 | | | |
| flat | 14 | image | — | | | |

In Table 4, f represents an overall focal length of the optical imaging module; fno represents an aperture value; HFOV represents a half field of view; TYPE represents a surface type; S represents a surface number; R represents a radius of curvature; thi represents a thickness; Nd represents a refractive index; Vd represents a dispersion coefficient; EFL represents a focal length; OBJ represents an object to be photographed; inf represents infinity; D0 represents a distance from the object to a vertex of the object-side surface of the first lens; ASP represents an aspheric surface; image represents the imaging surface; d1 represents an air space between a focusing lens and a fixed lens closest thereto at the object side; and d2 represents an air space between the focusing lens and a fixed lens closest thereto at the image side.

Table 5 shows aspheric coefficients according to an example, which corresponds to the optical imaging system shown in FIG. 5.

TABLE 5 aspheric coefficients

| surface | K | A | B | C | D | E |
|---|---|---|---|---|---|---|
| 1 | −3.18798E+00 | −1.92170E−03 | −1.08466E−04 | −1.98704E−04 | 1.91635E−05 | −4.41281E−06 |
| 2 | 0.00000E+00 | 7.85347E−04 | −6.75471E−04 | 1.14231E−04 | 2.79688E−05 | 1.12853E−06 |
| 3 | 0.00000E+00 | 3.47284E−04 | 1.03306E−03 | 4.99653E−05 | 1.15201E−04 | −4.00506E−06 |
| 4 | 0.00000E+00 | −1.11718E−03 | 1.59242E−03 | −2.80014E−04 | 1.81075E−04 | −2.34780E−05 |
| 6 | 0.00000E+00 | −1.66506E−02 | 1.69981E−03 | 4.91401E−04 | −9.81807E−05 | −3.87845E−05 |
| 7 | 0.00000E+00 | −2.73633E−02 | −2.93323E−03 | 1.76193E−03 | −8.19330E−04 | −1.63255E−04 |
| 8 | 0.00000E+00 | 8.83947E−03 | −5.19732E−03 | 1.35521E−03 | −4.27135E−04 | 2.32764E−05 |
| 9 | 0.00000E+00 | 8.59086E−03 | −3.48531E−03 | 9.39125E−04 | −3.21330E−04 | 1.30108E−05 |
| 10 | 0.00000E+00 | −4.47763E−02 | 3.44825E−03 | 3.44902E−03 | −2.09311E−03 | 2.93905E−04 |
| 11 | 0.00000E+00 | −4.63242E−02 | 7.98525E−03 | −3.56417E−04 | −5.28227E−04 | 8.16860E−05 |

In Table 5, surface represents a surface number.

Table 6 shows a position relationship of the focusing lens according to an example, which corresponds to the optical imaging system shown in FIG. 5.

TABLE 6 position relationship of the focusing lens

| | Pos1 | Pos2 |
|---|---|---|
| D0 | inf | 100 |
| d1 | 0.81 | 2.27 |
| d2 | 1.22 | 1.86 |

In Table 6, D0 represents a distance between an object to be photographed and a vertex of the first lens close to the object side; Pos1 represents a position relationship of the focusing lens when focusing on an object at infinity; Pos2 represents a position relationship of front and rear air spaces of the focusing lens when focusing on an object at 100 mm; and inf represents infinity.

Figure 8:
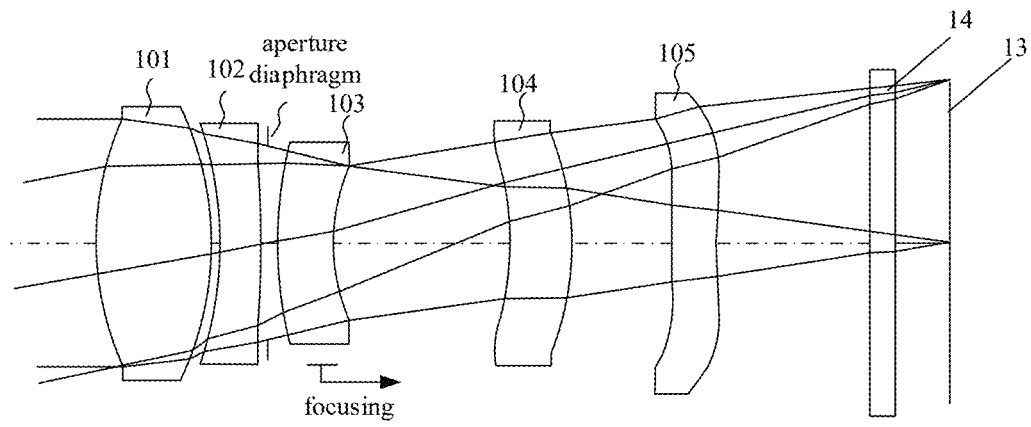
FIG. 8 is a schematic diagram showing an optical imaging module according to another example of the present disclosure.
Figure 9:
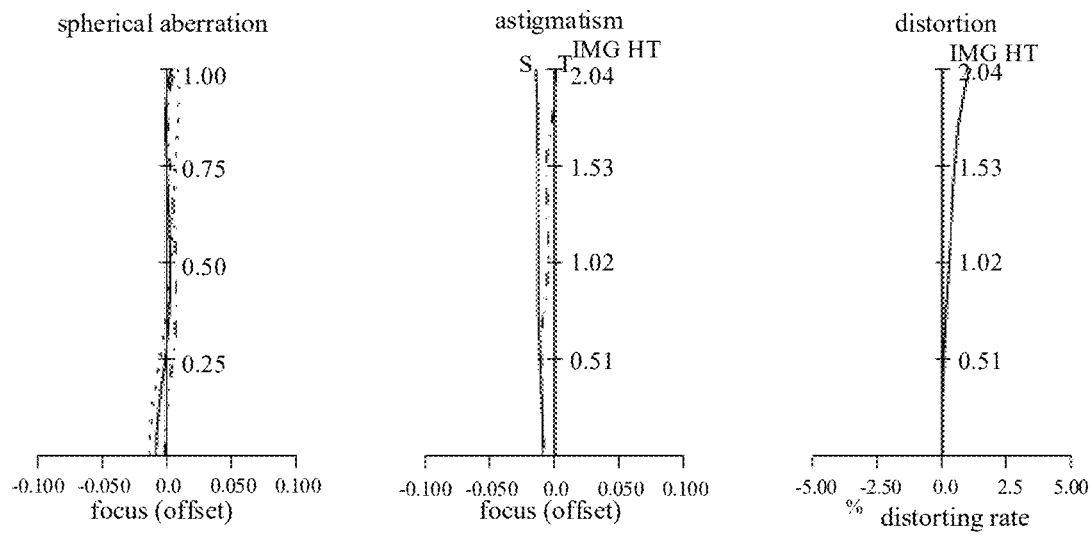
FIG. 9 is a schematic graph showing spherical aberration, astigmatism and distortion curves according to the example as shown in FIG. 8 of the present disclosure.
Figure 10:
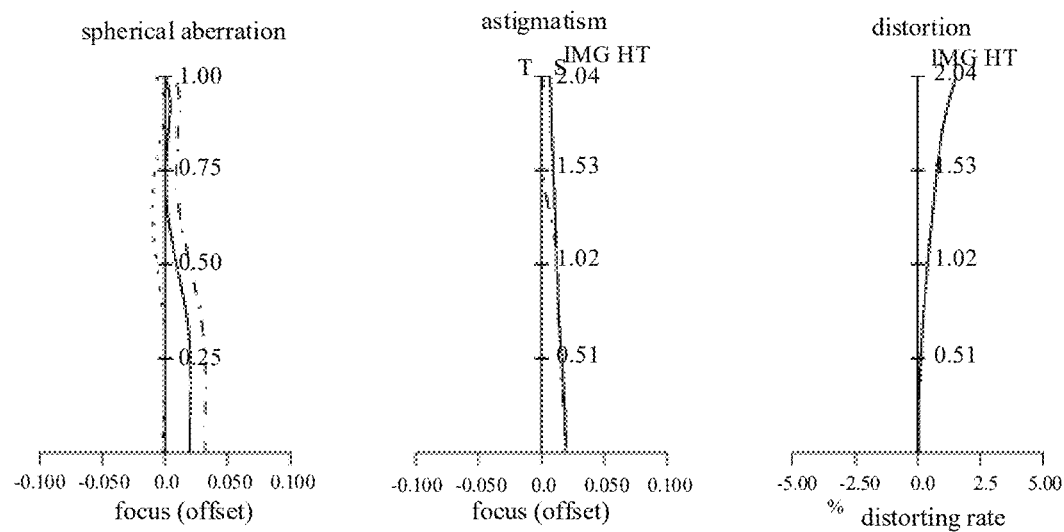
FIG. 10 is a schematic graph showing spherical aberration, astigmatism and distortion curves according to the example as shown in FIG. 8 of the present disclosure.

FIG. 8 is a schematic diagram showing an optical imaging module according to an example of the present disclosure. FIG. 9 is a schematic graph showing, from left to right, a spherical aberration curve, an astigmatism curve and a distortion curve obtained when an object distance is infinite, according to an example of the present disclosure. FIG. 10 is a schematic graph showing, from left to right, a spherical aberration curve, an astigmatism curve and a distortion curve obtained when an object distance is 100 mm, according to an example of the present disclosure. As shown in FIG. 8, the optical imaging module may include a first lens 101, a second lens 102, a third lens 103, a fourth lens 104 and a fifth lens 105.

The first lens 101 has a positive refractive power, and has a convex object-side surface and a convex image-side surface.

The second lens 102 has a negative refractive power, and has a concave object-side surface and a convex image-side surface.

The third lens 103 has a negative refractive power, and has a convex object-side surface and a concave image-side surface.

The fourth lens 104 has a positive refractive power, and has a concave object-side surface and a convex image-side surface.

The fifth lens 105 has a negative refractive power, and has a concave object-side surface and a concave image-side surface.

In some examples, the first lens, the second lens, the third lens, the fourth lens and the fifth lens may be made of a plastic material or other materials, which is not particularly limited herein.

Table 7 shows optical structure data of an optical imaging system according to an example, which corresponds to the optical imaging system shown in FIG. 8.

TABLE 7 optical structure data

| TYPE | f: 10.53 mm<br>S | R | fno: 3.40<br>thi | Nd | FOV: 10.8 deg<br>Vd | EFL |
|---|---|---|---|---|---|---|
| flat | OBJ | inf | D0 | | | |
| ASP | 1 | 3.61020 | 1.43 | 1.534 | 55.7 | 3.71 |

TABLE 7-continued optical structure data

| TYPE | f: S | 10.53 mm R | fno: thi | 3.40 Nd | FOV: Vd | 10.8 deg EFL |
|---|---|---|---|---|---|---|
| ASP | 2 | −3.77810 | 0.10 | | | |
| ASP | 3 | −3.94740 | 0.50 | 1.612 | 25.6 | −8.56 |
| ASP | 4 | −16.82930 | 0.10 | | | |
| flat | STO | inf | d1 | | | |
| ASP | 6 | 4.59900 | 0.67 | 1.534 | 55.7 | −7.77 |
| ASP | 7 | 2.07040 | d2 | | | |
| ASP | 8 | −3.14290 | 0.78 | 1.564 | 37.4 | 26.11 |
| ASP | 9 | −2.82340 | 1.22 | | | |
| ASP | 10 | 7.18500 | 0.56 | 1.508 | 56.5 | −40.21 |
| ASP | 11 | 5.17560 | 1.91 | | | |
| flat | 12 | inf | 0.31 | 1.517 | 64.20 | — |
| flat | 13 | inf | 0.69 | | | |
| flat | 14 | image | | | | |

In Table 7, f represents an overall focal length of the optical imaging module; fno represents an aperture value; HFOV represents a half field of view; TYPE represents a surface type; S represents a surface number; R represents a radius of curvature; thi represents a thickness; Nd represents a refractive index; Vd represents a dispersion coefficient; EFL represents a focal length; OBJ represents an object to be photographed; inf represents infinity; D0 represents a distance from the object to a vertex of the object-side surface of the first lens; ASP represents an aspheric surface; image represents the imaging surface; d1 represents an air space between a focusing lens and a fixed lens closest thereto at the object side; and d2 represents an air space between the focusing lens and a fixed lens closest thereto at the image side.

Table 8 shows aspheric coefficients according to an example, which corresponds to the optical imaging system shown in FIG. 8.

TABLE 8 aspheric coefficients

| surface | K | A | B | C | D | E |
|---|---|---|---|---|---|---|
| 1 | −5.39564E−01 | 6.85313E−04 | −1.17759E−04 | −4.40414E−04 | 1.11670E−04 | −5.15005E−05 |
| 2 | 0.00000E+00 | 5.11247E−03 | 2.16853E−04 | −1.82106E−04 | −8.33817E−05 | 4.31669E−06 |
| 3 | 0.00000E+00 | 4.62351E−03 | 3.37811E−03 | 1.03886E−04 | 1.14646E−05 | −3.09831E−06 |
| 4 | 0.00000E+00 | 3.28252E−03 | 2.64330E−03 | 9.23281E−04 | −4.13695E−05 | −2.21156E−05 |
| 6 | 0.00000E+00 | −1.46413E−02 | 1.78317E−03 | 6.73845E−04 | −3.35859E−04 | −3.87845E−05 |
| 7 | 0.00000E+00 | −2.35946E−02 | 1.41451E−03 | 1.00002E−03 | −8.63114E−04 | −1.63255E−04 |
| 8 | 0.00000E+00 | 2.53790E−02 | −8.64970E−06 | 5.44548E−03 | −1.24831E−03 | 2.32764E−05 |
| 9 | 0.00000E+00 | 1.33623E−02 | 1.65685E−03 | 2.09456E−03 | 2.36369E−05 | 1.30108E−05 |
| 10 | 0.00000E+00 | −6.88126E−02 | −2.50444E−03 | 4.22220E−03 | −1.73874E−03 | 2.93905E−04 |
| 11 | 0.00000E+00 | −7.47929E−02 | 5.97951E−03 | 7.58186E−04 | −5.24449E−04 | 7.30844E−05 |

In Table 8, surface represents a surface number.

Table 9 shows position relationships of the focusing lens according to an example, which corresponds to the optical imaging system shown in FIG. 8.

TABLE 9 position relationships of the focusing lens

| | Pos1 | Pos2 |
|---|---|---|
| D0 | inf | 100 |
| d1 | 0.13 | 2.21 |
| d2 | 0.64 | 1.69 |

In Table 9, D0 represents a distance between an object to be photographed and a vertex of the first lens close to the object side; Pos1 represents a position relationship of the focusing lens when focusing on an object at infinity; Pos2 represents a position relationship of front and rear air spaces of the focusing lens when focusing on an object at 100 mm; and inf represents infinity.

In examples of the present disclosure, the cooperation of the third lens with a negative refractive power, the fourth lens with a positive refractive power, and the fifth lens with a negative refractive may effectively correct aberrations (especially the field curvature and the coma aberration) to the greatest extent. Moreover, the good fitness of the surface shapes of the lenses is also conducive to the correction of the field curvature, the astigmatism and the distortion. At the same time, the positive refractive power of the fourth lens can further shorten the total length of the system and reduce the eccentric sensitivity of each lens.

Moreover, a focal power distribution manner of the first lens and the third lens is specified, and based on the positive refractive power of the first lens, the negative refractive power of the second lens, and the negative refractive power of the third lens, the total optical length is shortened, and at the same time, the optical refractive power of the first lens is shared, the focal power of the first lens is weakened, and a good chromatic aberration cancellation effect is achieved.

Figure 11:
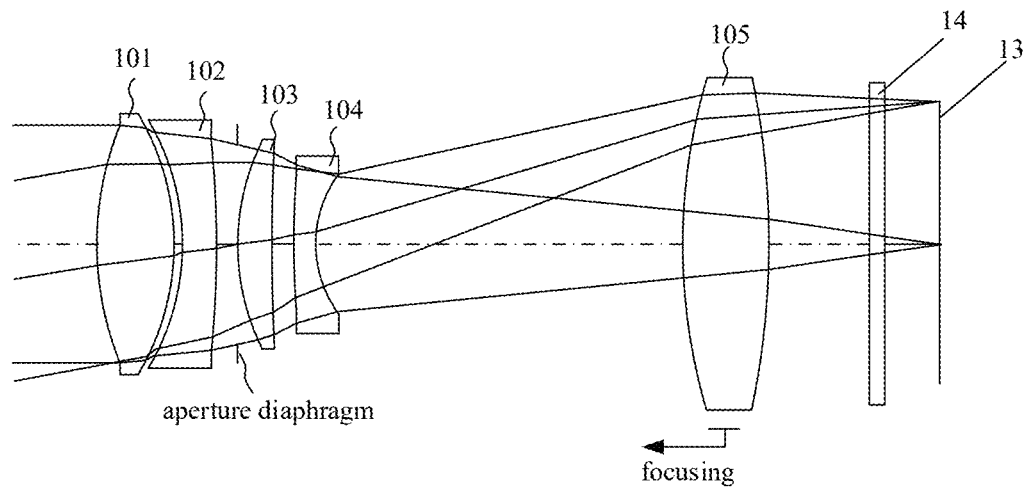
FIG. 11 is a schematic diagram showing an optical imaging module according to another example of the present disclosure.
Figure 12:
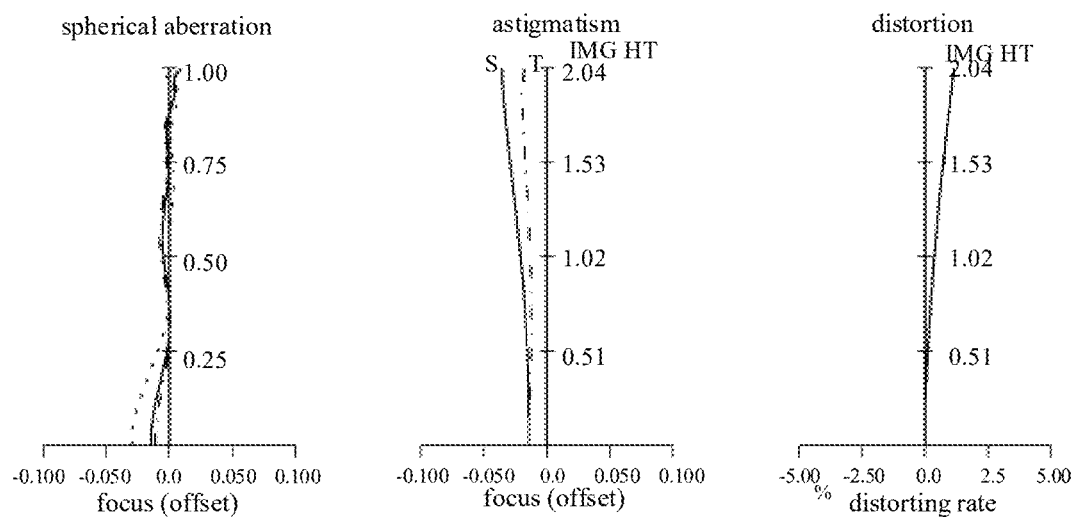
FIG. 12 is a schematic graph showing spherical aberration, astigmatism and distortion curves according to the example as shown in FIG. 11 of the present disclosure.
Figure 13:
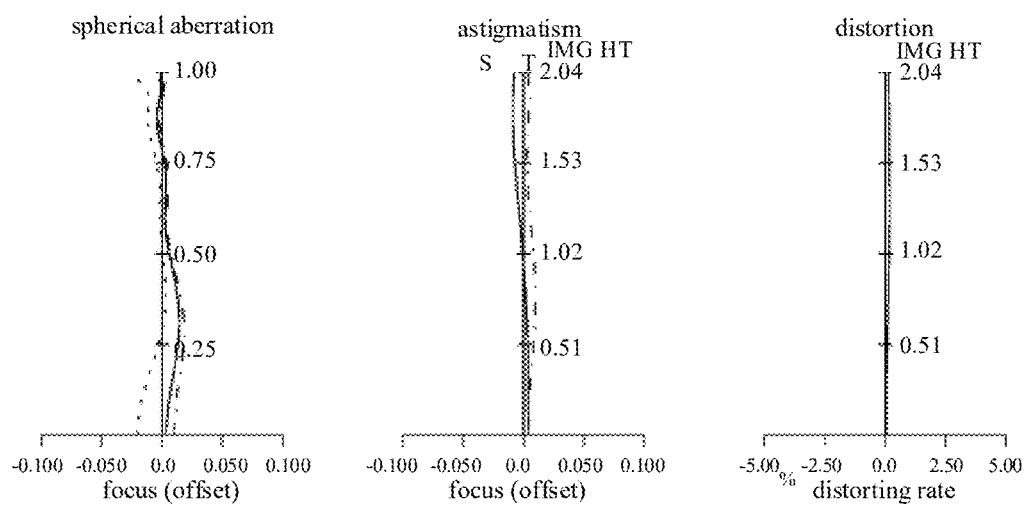
FIG. 13 is a schematic graph showing spherical aberration, astigmatism and distortion curves according to the example as shown in FIG. 11 of the present disclosure.

FIG. 11 is a schematic diagram showing an optical imaging module according to an example of the present disclosure. FIG. 12 is a schematic graph showing, from left to right, a spherical aberration curve, an astigmatism curve and a distortion curve obtained when an object distance is infinite, according to an example of the present disclosure. FIG. 13 is a schematic graph showing, from left to right, a spherical aberration curve, an astigmatism curve and a distortion curve obtained when an object distance is 100 mm, according to an example of the present disclosure. As shown in FIG. 11, the optical imaging module may include a first lens 101, a second lens 102, a third lens 103, a fourth lens 104 and a fifth lens 105.

The first lens 101 has a positive refractive power, and has a convex object-side surface and a convex image-side surface.

The second lens 102 has a negative refractive power, and has a concave object-side surface and a convex image-side surface.

The third lens 103 has a positive refractive power, and has a convex object-side surface and a concave image-side surface.

The fourth lens 104 has a negative refractive power, and has a convex object-side surface and a concave image-side surface.

The fifth lens 105 has a positive refractive power, and has a convex object-side surface and a convex image-side surface.

In some examples, the first lens, the second lens, the third lens, the fourth lens and the fifth lens may be made of a plastic material or other materials, which is not particularly limited herein.

Table 10 shows optical structure data of an optical imaging system according to an example, which corresponds to the optical imaging system shown in FIG. 11.

TABLE 10 optical structure data

| TYPE | f:<br>S | 11.50 mm<br>R | fno:<br>thi | 3.40<br>Nd | FOV:<br>Vd | 10.0 deg<br>EFL |
|---|---|---|---|---|---|---|
| flat | OBJ | inf | D0 | | | |
| ASP | 1 | 4.68730 | 1.10 | 1.535 | 55.7 | 3.42 |
| ASP | 2 | −2.75230 | 0.10 | | | |
| ASP | 3 | −2.84420 | 0.50 | 1.614 | 25.6 | −5.14 |
| ASP | 4 | −30.51800 | 0.30 | | | |
| flat | STO | inf | 0.00 | | | |
| ASP | 6 | 2.69000 | 0.50 | 1.671 | 19.2 | 5.31 |
| ASP | 7 | 10.14660 | 0.30 | | | |
| ASP | 8 | 9.00150 | 0.30 | 1.614 | 25.6 | −2.71 |
| ASP | 9 | 1.38810 | d1 | | | |
| ASP | 10 | 7.50780 | 1.24 | 1.544 | 56.0 | 9.50 |
| ASP | 11 | −15.61660 | d2 | | | |
| flat | 12 | inf | 0.21 | 1.517 | 64.20 | — |
| flat | 13 | inf | 0.80 | | | |
| flat | 14 | image | — | | | |

In Table 10, f represents an overall focal length of the optical imaging module; fno represents an aperture value; HFOV represents a half field of view; TYPE represents a surface type; S represents a surface number; R represents a radius of curvature; thi represents a thickness; Nd represents a refractive index; Vd represents a dispersion coefficient; EFL represents a focal length; OBJ represents an object to be photographed; inf represents infinity; D0 represents a distance from the object to a vertex of the object-side surface of the first lens; ASP represents an aspheric surface; image represents the imaging surface; d1 represents an air space between a focusing lens and a fixed lens closest thereto at the object side; and d2 represents an air space between the focusing lens and a fixed lens closest thereto at the image side.

Table 11 shows aspheric coefficients according to an example, which corresponds to the optical imaging system shown in FIG. 11.

In Table 11, surface represents a surface number.

Table 12 shows position relationships of the focusing lens according to an example, which corresponds to the optical imaging system shown in FIG. 11.

TABLE 12

| position relationships of the focusing lens | | |
|---|---|---|
| | Pos1 | Pos2 |
| D0 | inf | 100 |
| d1 | 5.22 | 1.43 |
| d2 | 3.34 | 3.31 |

In Table 12, D0 represents a distance between an object to be photographed and a vertex of the first lens close to the object side; Pos1 represents a position relationship of the focusing lens when focusing on an object at infinity; Pos2 represents a position relationship of front and rear air spaces of the focusing lens when focusing on an object at 100 mm; and inf represents infinity.

Figure 14:
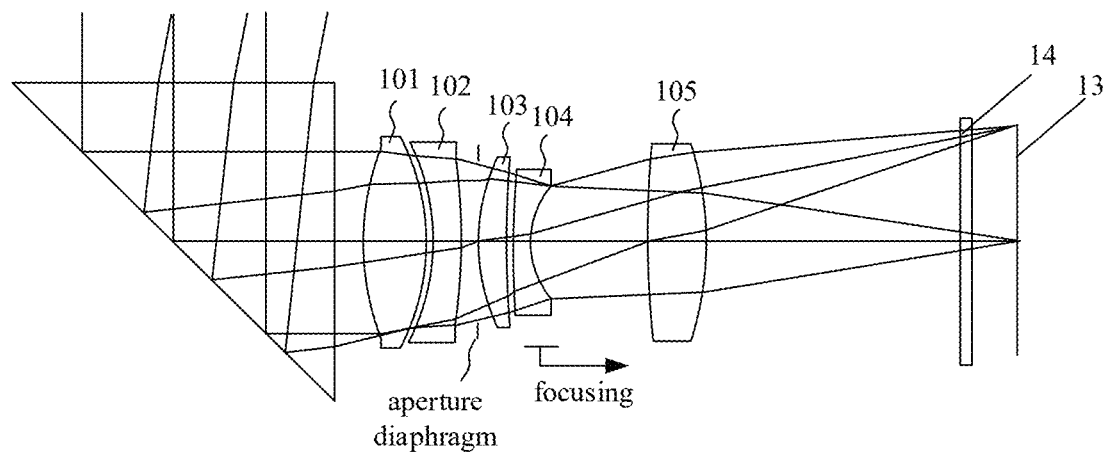
FIG. 14 is a schematic diagram showing an optical imaging module according to another example of the present disclosure.
Figure 15:
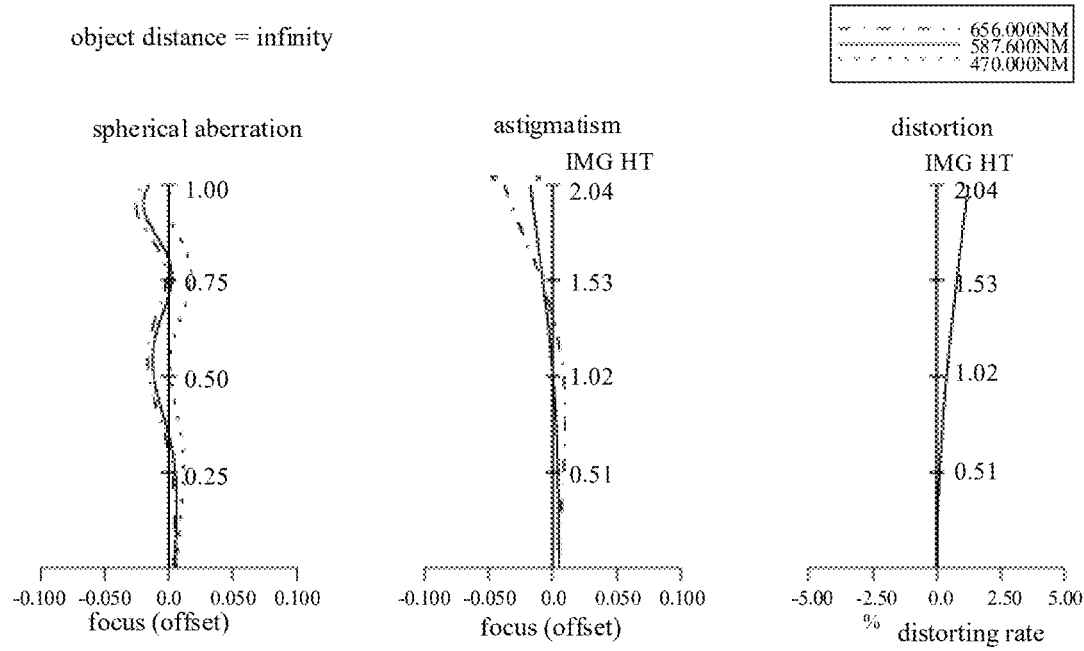
FIG. 15 is a schematic graph showing spherical aberration, astigmatism and distortion curves according to the example as shown in FIG. 14 of the present disclosure.
Figure 16:
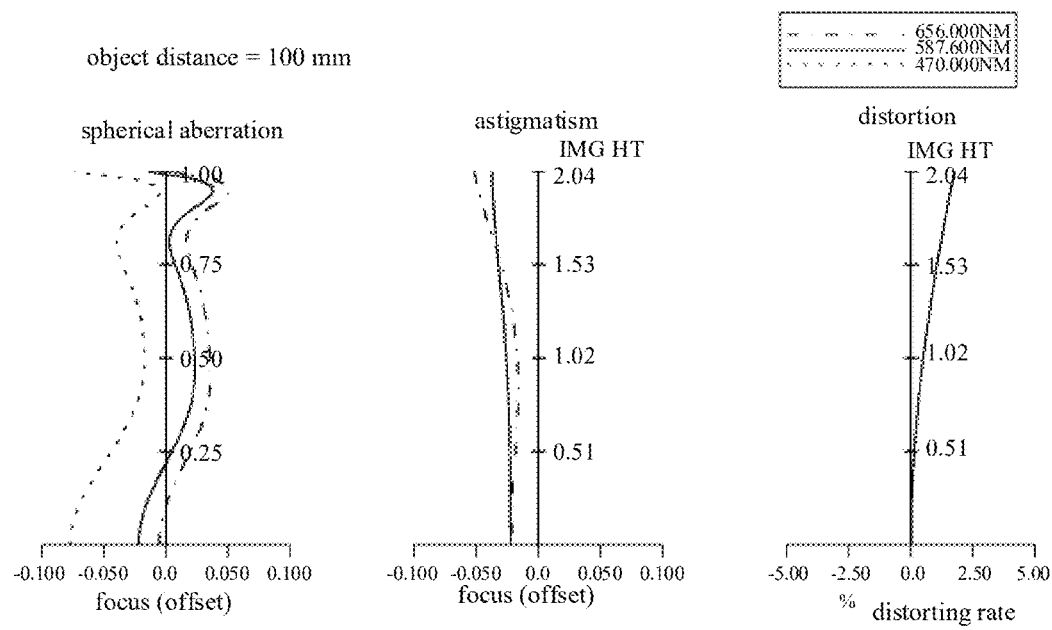
FIG. 16 is a schematic graph showing spherical aberration, astigmatism and distortion curves according to the example as shown in FIG. 14 of the present disclosure.

FIG. 14 is a schematic diagram showing an optical imaging module according to an example of the present disclosure. FIG. 15 is a schematic graph showing, from left to right, a spherical aberration curve, an astigmatism curve and a distortion curve obtained when an object distance is infinite, according to an example of the present disclosure. FIG. 16 is a schematic graph showing, from left to right, a spherical aberration curve, an astigmatism curve and a distortion curve obtained when an object distance is 100 mm, according to an example of the present disclosure. As shown in FIG. 14, the optical imaging module may include a first lens 101, a second lens 102, a third lens 103, a fourth lens 104 and a fifth lens 105.

The first lens 101 has a positive refractive power, and has a convex object-side surface and a convex image-side surface.

The second lens 102 has a negative refractive power, and has a concave object-side surface and a convex image-side surface.

The third lens 103 has a positive refractive power, and has a convex object-side surface and a concave image-side surface.

The fourth lens 104 has a negative refractive power, and has a convex object-side surface and a concave image-side surface.

The fifth lens 105 has a positive refractive power, and has a convex object-side surface and a convex image-side surface.

TABLE 11

| aspheric coefficients | | | | | | |
|---|---|---|---|---|---|---|
| surface | K | A | B | C | D | E |
| 1 | −4.45955E−01 | 1.95945E−03 | 2.63097E−04 | −4.10008E−04 | 3.30672E−04 | −9.12409E−05 |
| 2 | 0.00000E+00 | 1.41844E−02 | 2.59213E−03 | 1.51534E−04 | −3.75234E−04 | 5.27990E−05 |
| 3 | 0.00000E+00 | −5.42296E−04 | 5.93367E−03 | −4.64954E−04 | −9.97422E−05 | 4.66785E−05 |
| 4 | 0.00000E+00 | −2.32410E−02 | 5.89833E−03 | −1.59020E−03 | 9.89337E−04 | −1.30490E−04 |
| 6 | 0.00000E+00 | −3.04444E−02 | 3.60766E−03 | −4.87986E−04 | −2.85905E−03 | 1.42899E−03 |
| 7 | 0.00000E+00 | −1.77521E−02 | 4.89684E−03 | −7.38581E−03 | 1.33839E−03 | 7.98758E−04 |
| 8 | 0.00000E+00 | −1.30771E−02 | −1.56095E−02 | 7.32824E−04 | 6.93463E−03 | −2.38107E−03 |
| 9 | 0.00000E+00 | −5.17978E−02 | −3.41448E−02 | −3.43432E−03 | 1.65332E−02 | −1.00225E−02 |
| 10 | 0.00000E+00 | 6.35267E−05 | −5.84465E−04 | 2.47168E−04 | −4.96941E−05 | 3.18857E−06 |
| 11 | 0.00000E+00 | 2.72018E−05 | −9.87094E−04 | 3.59362E−04 | −6.32988E−05 | 3.75326E−06 |

In some examples, the first lens, the second lens, the third lens, the fourth lens and the fifth lens may be made of a plastic material or other materials, which is not particularly limited herein.

Table 13 shows optical structure data of an optical imaging system according to an example, which corresponds to the optical imaging system shown in FIG. 14. Due to the effect of a deflecting prism, signs of data from a reflection surface to the imaging surface are reversed.

TABLE 13 optical structure data

| TYPE | f:<br>S | 10.50 mm<br>R | fno:<br>thi | 3.26<br>Nd | FOV:<br>Vd | 10.9 deg<br>EFL |
|---|---|---|---|---|---|---|
| flat | OBJ | inf | D0 | | | |
| flat | Prism<br>Decenter(1) | inf | 2.82 | 1.740 | 28.3 | — |
| reflection | and Bend(1) | inf | −2.82 | | | |
| flat | space | inf | −0.5 | | | |
| ASP | 1 | −4.83253 | −1.10 | 1.535 | 55.7 | 3.67 |
| ASP | 2 | 3.03999 | −0.10 | | | |
| ASP | 3 | 3.13755 | −0.50 | 1.614 | 25.6 | −6.01 |
| ASP | 4 | 22.10554 | −0.30 | | | |
| flat | STO | inf | 0.00 | | | |
| ASP | 6 | −2.73667 | −0.51 | 1.671 | 19.2 | 5.43 |
| ASP | 7 | −10.18141 | d1 | | | |
| ASP | 8 | −8.61941 | −0.31 | 1.614 | 25.6 | −2.72 |
| ASP | 9 | −1.37919 | d2 | | | |
| ASP | 10 | −36.19200 | −1.00 | 1.544 | 56.0 | 10.01 |
| ASP | 11 | 6.34520 | −4.46 | | | |
| flat | 12 | inf | −0.21 | 1.517 | 64.20 | — |
| flat | 13 | inf | −0.80 | | | |
| flat | 14 | image | — | | | |

In Table 13, f represents an overall focal length of the optical imaging module; fno represents an aperture value; HFOV represents a half field of view; TYPE represents a surface type; S represents a surface number; R represents a radius of curvature; thi represents a thickness of each lens and an air space between adjacent lenses; Nd represents a refractive index; Vd represents a dispersion coefficient; EEL represents a focal length; OBJ represents an object to be photographed; inf represents infinity; D0 represents a distance from the object to a vertex of the object-side surface of the first lens; ASP represents an aspheric surface; image represents the imaging surface; d1 represents an air space between a focusing lens and a fixed lens closest thereto at the object side; and d2 represents an air space between the focusing lens and a fixed lens closest thereto at the image side.

Table 14 shows aspheric coefficients according to an example, which corresponds to the optical imaging system shown in FIG. 14.

In Table 14, surface represents a surface number.

Table 15 shows position relationships of the focusing lens according to an example, which corresponds to the optical imaging system shown in FIG. 14.

TABLE 15 position relationships of the focusing lens

| | Pos1 | Pos2 |
|---|---|---|
| D0 | inf | 100 |
| d1 | −0.10 | −2.06 |
| d2 | −0.24 | −1.92 |

In Table 15, D0 represents a distance between an object to be photographed and a vertex of the first lens close to the object side; Pos1 represents a position relationship of the focusing lens when focusing on an object at infinity; Pos2 represents a position relationship of front and rear air spaces of the focusing lens when focusing on an object at 100 mm; and inf represents infinity.

In some examples, the optical imaging module may further include a deflecting prism, such as a right angle prism or a reflective lens.

Figure 17:
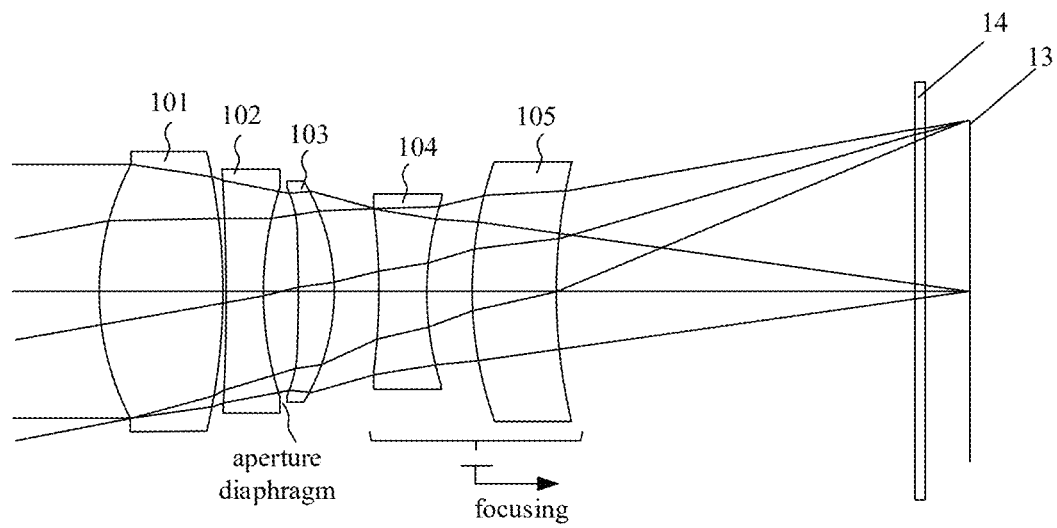
FIG. 17 is a schematic diagram showing an optical imaging module according to another example of the present disclosure.
Figure 18:
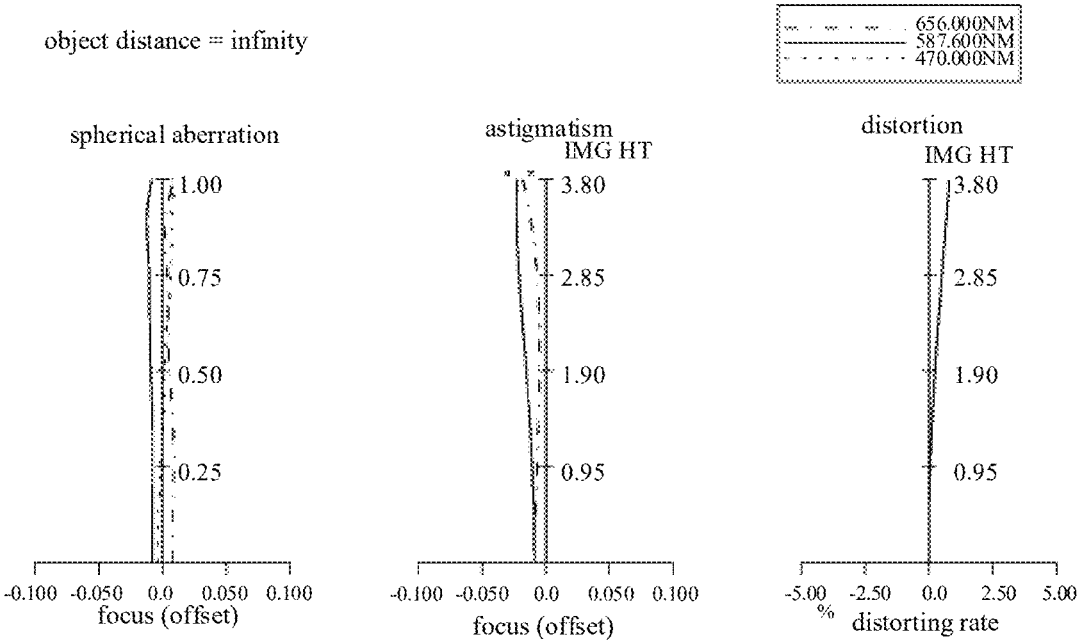
FIG. 18 is a schematic graph showing spherical aberration, astigmatism and distortion curves according to the example as shown in FIG. 17 of the present disclosure.
Figure 19:
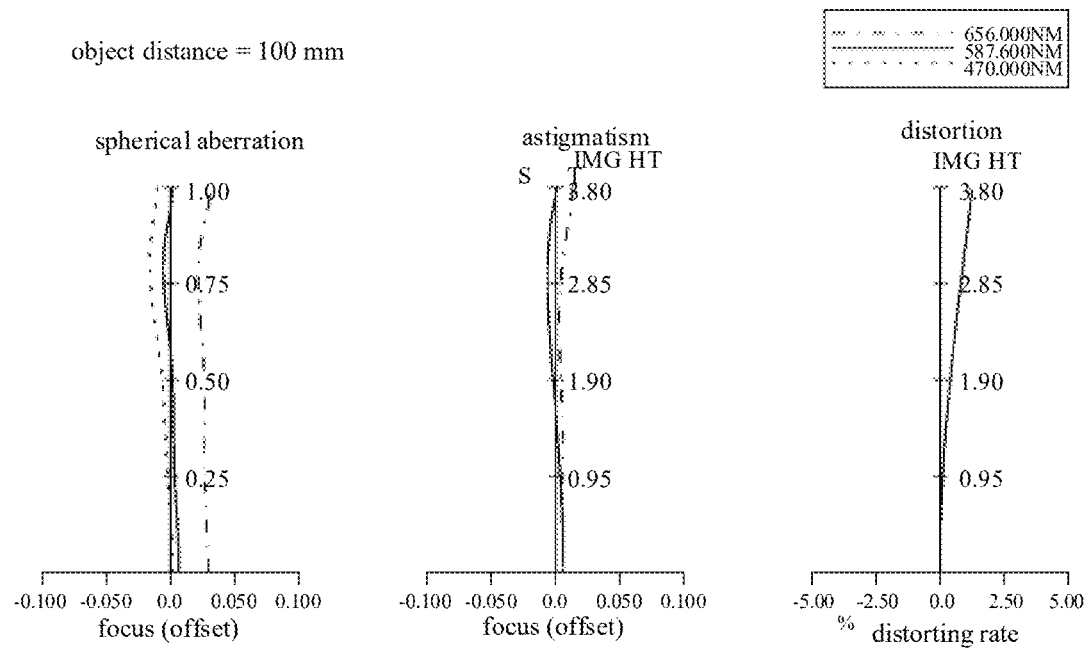
FIG. 19 is a schematic graph showing spherical aberration, astigmatism and distortion curves according to the example as shown in FIG. 17 of the present disclosure.

FIG. 17 is a schematic diagram showing an optical imaging module according to an example of the present disclosure. FIG. 18 is a schematic graph showing, from left to right, a spherical aberration curve, an astigmatism curve and a distortion curve obtained when an object distance is infinite, according to an example of the present disclosure. FIG. 19 is a schematic graph showing, from left to right, a spherical aberration curve, an astigmatism curve and a distortion curve obtained when an object distance is 100 mm, according to an example of the present disclosure. As shown in FIG. 18, the optical imaging module may include a first lens 101, a second lens 102, a third lens 103, a fourth lens 104 and a fifth lens 105.

The first lens 101 has a positive refractive power, and has a convex object-side surface and a convex image-side surface.

The second lens 102 has a negative refractive power, and has a concave object-side surface and a concave image-side surface.

The third lens 103 has a positive refractive power, and has a concave object-side surface and a convex image-side surface.

The fourth lens 104 has a negative refractive power, and has a concave object-side surface and a concave image-side surface.

The fifth lens 105 has a positive refractive power, and has a convex object-side surface and a concave image-side surface.

TABLE 14 aspheric coefficients

| surface | K | A | B | C | D | E |
|---|---|---|---|---|---|---|
| 1 | −6.42880E−01 | −1.70492E−03 | −2.49138E−04 | 4.13660E−04 | −3.30154E−04 | 8.86193E−05 |
| 2 | 0.00000E+00 | −1.42108E−02 | −2.52105E−04 | −1.25143E−04 | 3.85880E−04 | −4.55392E−05 |
| 3 | 0.00000E+00 | 5.85368E−04 | −5.94789E−03 | 4.84238E−04 | 1.14532E−04 | −4.35644E−05 |
| 4 | 0.00000E+00 | 2.32575E−02 | −5.82616E−03 | 1.57514E−03 | −1.01359E−03 | 1.29737E−04 |
| 6 | 0.00000E+00 | 3.06346E−02 | −3.65204E−03 | 4.76010E−04 | 2.81418E−03 | −1.42899E−03 |
| 7 | 0.00000E+00 | 1.75625E−02 | −5.12336E−03 | 7.13832E−03 | −1.36608E−03 | −7.98758E−04 |
| 8 | 0.00000E+00 | 1.25988E−02 | 1.47234E−02 | −1.12395E−03 | −6.72799E−03 | 2.38107E−03 |
| 9 | 0.00000E+00 | 5.17101E−02 | 3.54586E−02 | 4.23796E−03 | −1.73280E−02 | 1.00225E−02 |
| 10 | 0.00000E+00 | −2.12510E−03 | 7.39861E−04 | −8.76007E−05 | 5.35347E−05 | −2.90584E−05 |
| 11 | 0.00000E+00 | −3.92889E−04 | 1.06614E−03 | −2.85519E−04 | 7.42405E−05 | −1.33502E−05 |

In some examples, the first lens, the second lens, the third lens, the fourth lens and the fifth lens may be made of a plastic material or other materials, which is not particularly limited herein.

Table 16 shows optical structure data of an optical imaging system according to an example, which corresponds to the optical imaging system shown in FIG. 17.

TABLE 16 optical structure data

| TYPE | f: 19.89 mm S | R | fno: 3.53 thi | FOV: 10.7deg Nd | Vd | EFL |
|---|---|---|---|---|---|---|
| flat | OBJ | inf | D0 | | | |
| ASP | 1 | 5.70300 | 2.69 | 1.544 | 55.9 | 8.3 |
| ASP | 2 | −18.58510 | 0.10 | | | |
| ASP | 3 | −251.72370 | 0.79 | 1.606 | 26.9 | −9.1 |
| ASP | 4 | 5.67670 | 0.42 | | | |
| flat | STO | inf | 0.34 | | | |
| ASP | 6 | −118.14250 | 0.81 | 1.544 | 55.9 | 12.2 |
| ASP | 7 | −6.34150 | d1 | | | |
| ASP | 8 | −7.54540 | 1.05 | 1.534 | 55.7 | −10.1 |
| ASP | 9 | 20.23310 | 0.97 | | | |
| ASP | 10 | 6.41920 | 1.86 | 1.667 | 19.2 | 46.5 |
| ASP | 11 | 7.12020 | d2 | | | |
| flat | 12 | inf | 0.21 | 1.516 | 64.17 | — |
| flat | 13 | inf | 1.00 | | | |
| flat | 14 | image | — | | | |

In Table 16, f represents an overall focal length of the optical imaging module; fno represents an aperture value; HFOV represents a half field of view; TYPE represents a surface type; S represents a surface number; R represents a radius of curvature; thi represents a thickness; Nd represents a refractive index; Vd represents a dispersion coefficient; EFL represents a focal length; OBJ represents an object to be photographed; inf represents infinity; D0 represents a distance from the object to a vertex of the object-side surface of the first lens; ASP represents an aspheric surface; image represents the imaging surface; d1 represents an air space between a focusing lens and a fixed lens closest thereto at the object side; and d2 represents an air space between the focusing lens and a fixed lens closest thereto at the image side.

Table 17 shows aspheric coefficients according to an example, which corresponds to the optical imaging system shown in FIG. 17.

In Table 17, surface represents a surface number.

Table 18 shows position relationships of the focusing lens according to an example, which corresponds to the optical imaging system shown in FIG. 17.

TABLE 18 position relationships of the focusing lens

| | Pos1 | Pos2 |
|---|---|---|
| D0 | inf | 100 |
| d1 | 1.00 | 3.27 |
| d2 | 7.86 | 5.59 |

In Table 18, D0 represents a distance between an object to be photographed and a vertex of the first lens close to the object side; Pos1 represents a position relationship of the focusing lens when focusing on an object at infinity; Pos2 represents a position relationship of front and rear air spaces of the focusing lens when focusing on an object at 100 mm; inf represents infinity; d1 represents an air space between the focusing lens and a fixed lens closest thereto at the object side; and d2 represents an air space between the focusing lens and a fixed lens closest thereto at the image side.

Figure 20:
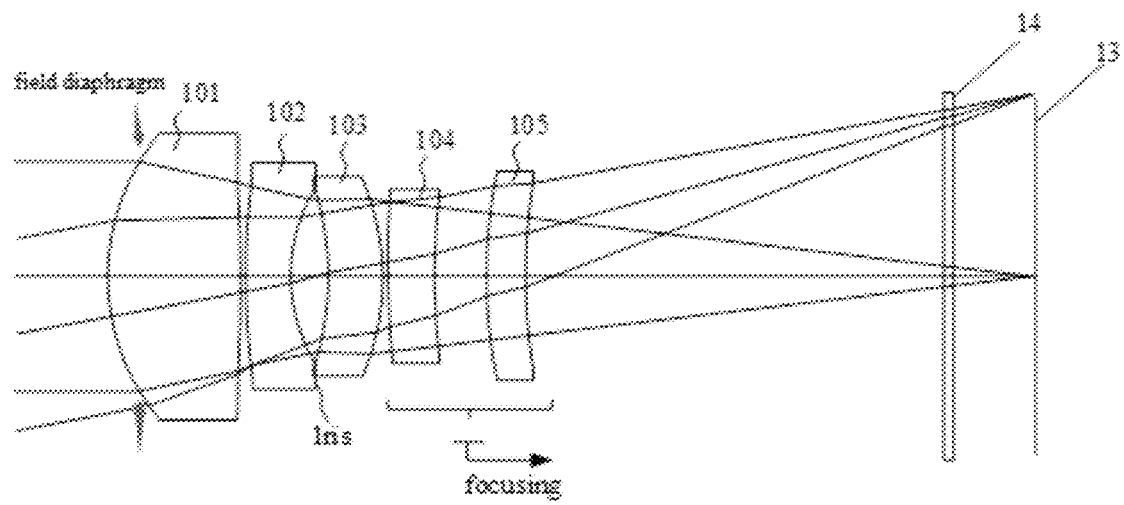
FIG. 20 is a schematic diagram showing an optical imaging module according to another example of the present disclosure.
Figure 21:
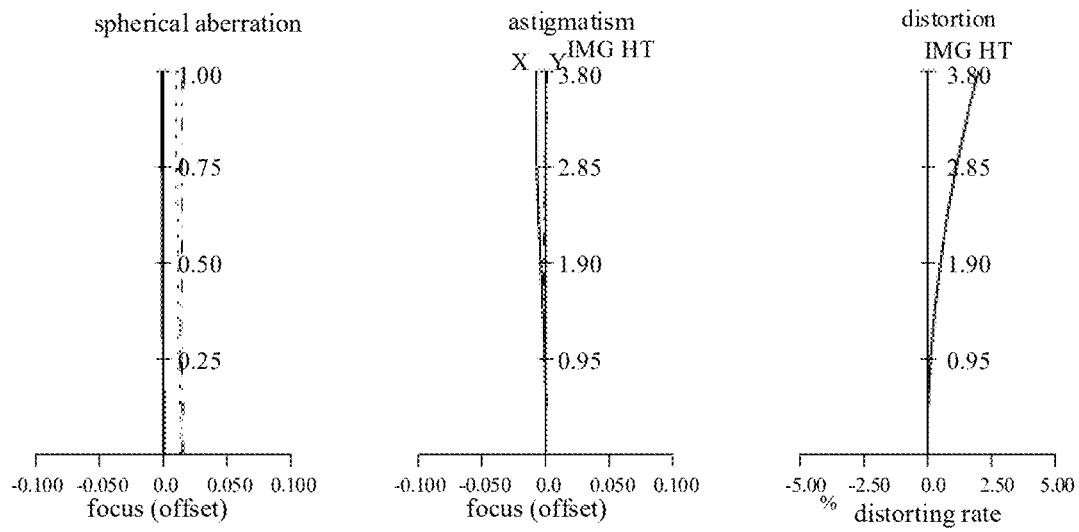
FIG. 21 is a schematic graph showing spherical aberration, astigmatism and distortion curves according to the example as shown in FIG. 20 of the present disclosure.
Figure 22:
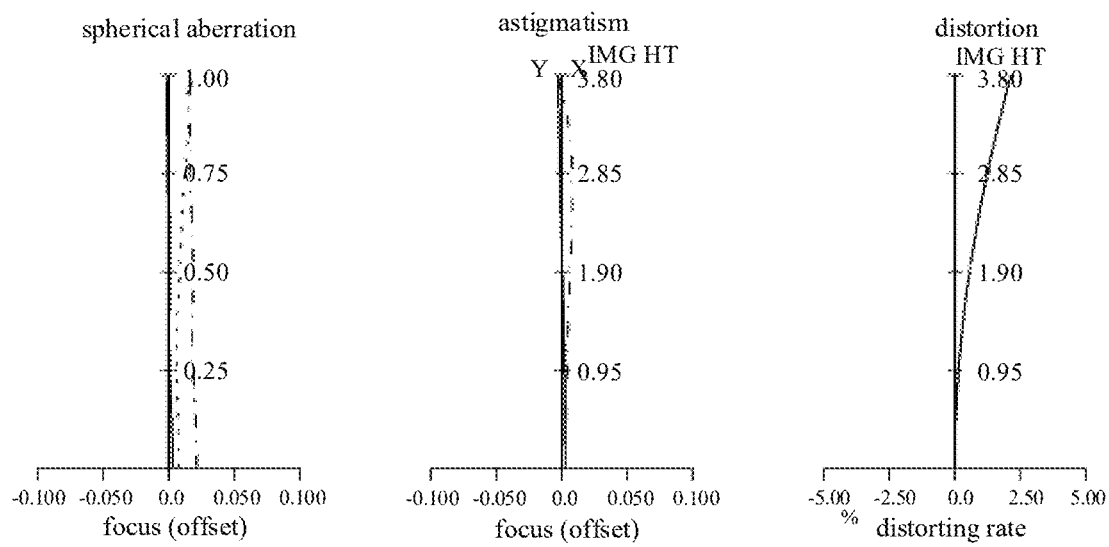
FIG. 22 is a schematic graph showing spherical aberration, astigmatism and distortion curves according to the example as shown in FIG. 20 of the present disclosure.

FIG. 20 is a schematic diagram showing an optical imaging module according to an example of the present disclosure. FIG. 21 is a schematic graph showing, from left to right, a spherical aberration curve, an astigmatism curve and a distortion curve obtained when an object distance is infinite, according to an example of the present disclosure. FIG. 22 is a schematic graph showing, from left to right, a spherical aberration curve, an astigmatism curve and a distortion curve obtained when an object distance is 500 mm, according to an example of the present disclosure. As shown in FIG. 20, the optical imaging module may include a first lens 101, a second lens 102, a third lens 103, a fourth lens 104 and a fifth lens 105.

The first lens 101 has a positive refractive power, and has a convex object-side surface and a convex image-side surface.

The second lens 102 has a negative refractive power, and has a convex object-side surface and a concave image-side surface.

The third lens 103 has a positive refractive power, and has a concave object-side surface and a convex image-side surface.

TABLE 17 aspheric coefficients

| surface | K | A | B | C | D | E | F |
|---|---|---|---|---|---|---|---|
| 1 | 5.40980E−01 | −6.35039E−04 | −3.02700E−05 | −7.04829E−06 | 3.87992E−07 | −5.48491E−08 | 0.00000E+00 |
| 2 | 0.00000E+00 | 1.90422E−03 | −3.54465E−04 | −7.89345E−06 | 4.85644E−06 | −6.26364E−07 | 2.99015E−08 |
| 3 | 0.00000E+00 | −3.30217E−03 | 1.90263E−04 | 1.39628E−05 | −1.17880E−06 | 1.73095E−08 | 0.00000E+00 |
| 4 | −9.17616E+00 | 6.75319E−05 | −5.28383E−04 | 1.53743E−04 | −1.37295E−05 | 1.98346E−07 | 8.27458E−08 |
| 6 | 0.00000E+00 | −3.00946E−03 | −9.18190E−04 | −3.64312E−06 | 6.37312E−06 | −6.48629E−07 | 0.00000E+00 |
| 7 | 0.00000E+00 | −1.37506E−03 | −4.02497E−04 | −5.50299E−05 | 1.20505E−05 | −1.14095E−06 | 0.00000E+00 |
| 8 | 0.00000E+00 | 1.43240E−02 | −1.71188E−03 | 1.11540E−04 | 2.85063E−05 | −8.51407E−06 | 6.85648E−07 |
| 9 | 0.00000E+00 | 1.39351E−02 | −1.25705E−03 | 1.27421E−04 | 4.02824E−06 | −1.63329E−06 | 0.00000E+00 |
| 10 | 0.00000E+00 | −3.51615E−03 | 4.66557E−06 | 2.04815E−O5 | 2.89661E−08 | −1.90597E−07 | 0.00000E+00 |
| 11 | 0.00000E+00 | −4.90333E−03 | 1.22450E−04 | −2.49900E−06 | 4.14364E−07 | −7.58105E−08 | 0.00000E+00 |

The fourth lens 104 has a negative refractive power, and has a convex object-side surface and a concave image-side surface.

The fifth lens 105 has a positive refractive power, and has a convex object-side surface and a concave image-side surface.

In some examples, the first lens, the second lens, the third lens, the fourth lens and the fifth lens may be made of a plastic material or other materials, which is not particularly limited herein.

Table 19 shows optical structure data of an optical imaging system according to an example, which corresponds to the optical imaging system shown in FIG. 20.

TABLE 19

| | | | | | | |
|---|---|---|---|---|---|---|
| | | optical structure data | | | | |
| TYPE | f: S | 19.89 mm R | fno: thi | 4.18 Nd | FOV: Vd | 10.6 deg EFL |
| flat | OBJ | inf | D0 | | | |
| ASP | 1 | 4.94380 | 2.74 | 1.543 | 56.1 | 7.8 |
| ASP | 2 | −24.52870 | 0.10 | | | |
| ASP | 3 | 8.49670 | 0.96 | 1.629 | 23.3 | −8.2 |
| ASP | 4 | 3.06960 | 0.48 | | | |
| flat | STO | inf | 0.27 | | | |
| ASP | 6 | −6.54850 | 1.12 | 1.654 | 21.3 | 33.8 |
| ASP | 7 | −5.39600 | d1 | | | |
| ASP | 8 | 54.53020 | 0.95 | 1.522 | 48.4 | −42.4 |
| ASP | 9 | 15.63950 | 1.10 | | | |
| ASP | 10 | 13.05280 | 0.80 | 1.674 | 19.0 | 338.9 |
| ASP | 11 | 13.50180 | d2 | | | |
| flat | 12 | inf | 0.21 | 1.516 | 64.17 | — |
| flat | 13 | inf | 1.70 | | | |
| flat | 14 | image | — | | | |

In Table 19, f represents an overall focal length of the optical imaging module; fno represents an aperture value; HFOV represents a half field of view; TYPE represents a surface type; S represents a surface number; R represents a radius of curvature; thi represents a thickness; Nd represents a refractive index; Vd represents a dispersion coefficient; EFL represents a focal length; OBJ represents an object to be photographed; inf represents infinity; D0 represents a distance from the object to a vertex of the object-side surface of the first lens; ASP represents an aspheric surface; image represents the imaging surface; d1 represents an air space between a focusing lens and a fixed lens closest thereto at the object side; and d2 represents an air space between the focusing lens and a fixed lens closest thereto at the image side.

Table 20 shows aspheric coefficients according to an example, which corresponds to the optical imaging system shown in FIG. 20.

In Table 20, surface represents a surface number.

Table 21 shows position relationships of the focusing lens according to an example, which corresponds to the optical imaging system shown in FIG. 20.

TABLE 21

| | | |
|---|---|---|
| | position relationships of the focusing lens | |
| | Pos1 | Pos2 |
| D0 | inf | 500 |
| d1 | 0.11 | 1.83 |
| d2 | 8.57 | 6.85 |

In Table 21, D0 represents a distance between an object to be photographed and a vertex of the first lens close to the object side; Pos1 represents a position relationship of the focusing lens when focusing on an object at infinity; Pos2 represents a position relationship of front and rear air spaces of the focusing lens when focusing on an object at 500 mm; inf represents infinity; d1 represents an air space between the focusing lens and a fixed lens closest thereto at the object side; and d2 represents an air space between the focusing lens and a fixed lens closest thereto at the image side.

In examples of the present disclosure, the cooperation of the third lens with a positive refractive power, the fourth lens with a negative refractive power, and the fifth lens with a positive refractive may effectively correct aberrations (especially the field curvature and the coma aberration) to the greatest extent. Moreover, the good fitness of the surface shapes of the lenses is also conducive to the correction of the field curvature, the astigmatism and the distortion.

In examples of the present disclosure, a focal power distribution manner of the first lens and the third lens is specified, and based on the positive refractive power of the first lens, the negative refractive power of the second lens, and the positive refractive power of the third lens, the total optical length is shortened, and at the same time, the optical refractive power of the first lens is shared, the focal power of the first lens is weaken, and a good chromatic aberration cancellation effect is achieved.

The corresponding parameters in Example 1 to Example 7 are shown in Table 22 below:

TABLE 20

| | | | | | | | |
|---|---|---|---|---|---|---|---|
| | | | | aspheric coefficients | | | |
| surface | K | A | B | C | D | E | F |
| 1 | 7.26959E−01 | −2.97968E−04 | −2.57643E−05 | 1.99468E−06 | −4.85120E−07 | 2.70247E−08 | 0.00000E+00 |
| 2 | 0.00000E+00 | 2.37050E−03 | −1.28480E−04 | −6.19635E−06 | 5.18614E−06 | −5.65383E−07 | 4.57167E−08 |
| 3 | −1.98449E+01 | −3.83414E−03 | −8.60239E−05 | 1.90660E−05 | 9.01807E−07 | 1.30677E−07 | 0.00000E+00 |
| 4 | −3.54294E+00 | 2.27510E−03 | −6.38411E−04 | 1.22916E−04 | −5.63116E−06 | −7.96380E−07 | 2.11335E−07 |
| 6 | 0.00000E+00 | −6.77930E−05 | −9.67318E−05 | 0.00000E+00 | 0.00000E+00 | 0.00000E+00 | 0.00000E+00 |
| 8 | 0.00000E+00 | 2.72577E−03 | 1.92913E−05 | −8.20973E−05 | 3.18603E−05 | −6.15073E−06 | 4.58166E−07 |
| 9 | 0.00000E+00 | 4.60576E−03 | −3.75279E−05 | −3.14166E−05 | 1.26244E−05 | −1.87565E−06 | 0.00000E+00 |
| 10 | 0.00000E+00 | 1.18277E−03 | −7.05315E−06 | 2.00116E−06 | −2.23949E−07 | 0.00000E+00 | 0.00000E+00 |

TABLE 22

Example parameters

| condition | Example 1 | Example 2 | Example 3 | Example 4 | Example 5 | Example 6 | Example 7 |
|---|---|---|---|---|---|---|---|
| f/f1 | 2.98 | 2.63 | 2.85 | 3.39 | 2.87 | 2.39 | 2.55 |
| \|f3/f1\| | 1.70 | 1.22 | 2.10 | 1.55 | 1.47 | 1.47 | 4.27 |
| TTL/IH | 5.88 | 5.88 | 5.21 | 5.88 | 5.62 | 5.03 | 5.03 |
| \|f/f3\| | 1.76 | 2.16 | 1.36 | 2.18 | 1.96 | 1.63 | 0.60 |
| \|fm/f\| | 0.68 | 0.46 | 0.73 | 2.27 | 0.26 | 0.59 | 2.37 |
| \|f/f4\| | 1.43 | 0.78 | 0.41 | 4.28 | 3.90 | 1.97 | 0.47 |
| \|f/f5\| | 1.14 | 0.46 | 0.26 | 1.22 | 1.05 | 0.43 | 0.06 |
| R1/R2 | −1.47 | −1.79 | −0.96 | −1.70 | −1.59 | −0.31 | −0.20 |
| (R3 + R4)/(R3 − R4) | −3.57 | −5.80 | −1.61 | −1.21 | −1.43 | 0.96 | 2.13 |
| f/\|R5\| + f/\|R6\| | 2.87 | 9.17 | 7.38 | 5.46 | 4.87 | 3.30 | 6.72 |
| R7/R8 | 2.45 | 1.24 | 1.11 | 6.48 | 6.25 | −0.37 | 3.49 |
| Ls/TTL | 0.75 | 0.73 | 0.63 | 0.83 | 0.83 | 0.79 | 0.78 |
| Td/TTL | 0.57 | 0.69 | 0.73 | 0.80 | 0.52 | 0.52 | 0.45 |
| FOV | 20.00 | 19.00 | 21.60 | 20.00 | 21.80 | 21.46 | 21.22 |
| CRA | 14.89 | 15.06 | 12.65 | 3.91 | 11.36 | 16.53 | 15.70 |
| N5 | 1.58 | 1.54 | 1.51 | 1.54 | 1.54 | 1.67 | 1.68 |
| f/Denp (Fno) | 3.48 | 3.94 | 3.40 | 3.43 | 3.26 | 3.53 | 3.68 |
| Vd1 | 55.71 | 55.71 | 55.71 | 55.71 | 55.71 | 55.91 | 56.10 |
| Vd2 | 25.59 | 25.59 | 25.59 | 25.59 | 25.59 | 26.90 | 23.30 |

In some examples, the optical imaging module may be disposed in an optical imaging device. The optical imaging device may include other component for capturing images, such as a camera component.

In some examples, the optical imaging device may be disposed in an electronic device, and the electronic device may include a mobile terminal and a stationary terminal. The mobile terminal may include a mobile phone, a laptop, a tablet computer, a wearable electronic device and the like, and the stationary terminal may include a personal computer device, a monitoring device, or a medical device. The electronic device in examples of the present disclosure includes a display module, which may be a display screen of the electronic device.

Figure 23:
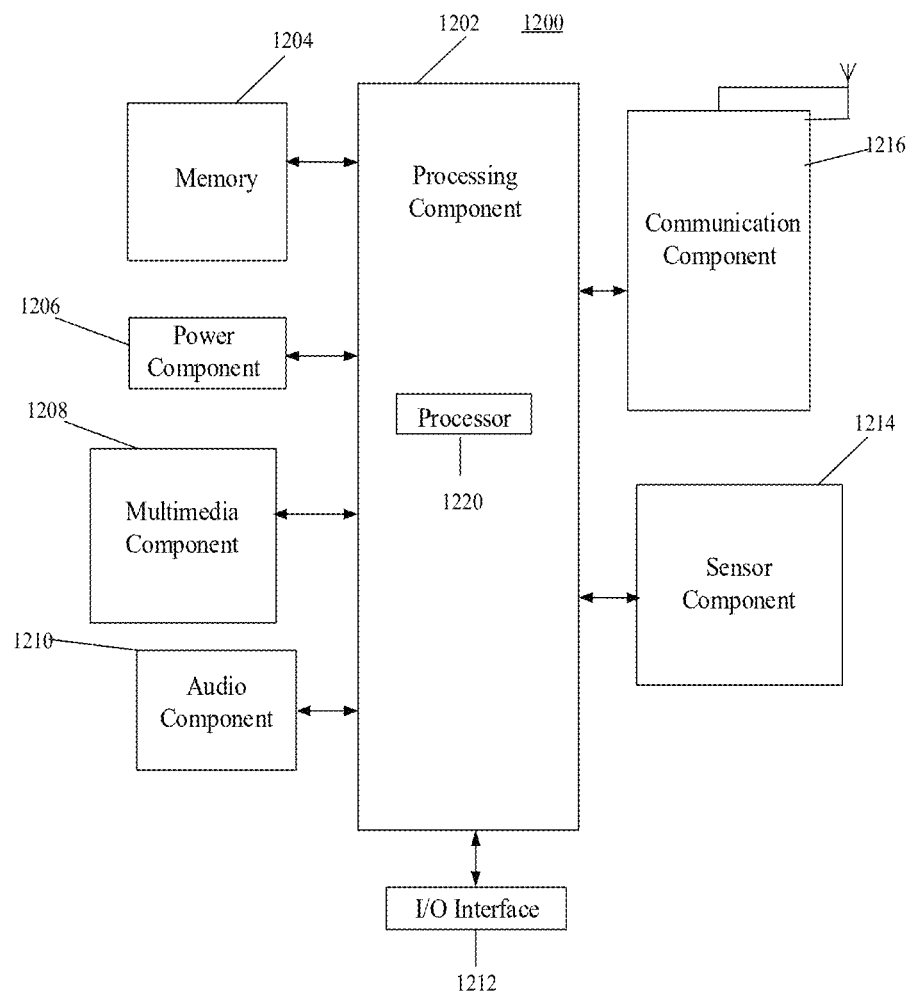
FIG. 23 is a block diagram illustrating an electronic device according to an example of the present disclosure.

FIG. 23 is a block diagram illustrating a hardware structure of an electronic device according to an example of the present disclosure. For example, the electronic device 1200 may be a mobile phone, a computer, a digital broadcasting terminal, a messaging device, a game console, a tablet device, a medical device, a fitness device, and a personal digital assistant, etc.

Referring to FIG. 23, the electronic device 1200 may include one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 generally controls the overall operations of the electronic device 1200, such as operations associated with display, telephone calls, data communications, camera operations, and recording operations. The processing component 1202 may include one or more processors. In addition, the processing component 1202 may include one or more modules to facilitate the interaction between the processing component 1202 and other components. For example, the processing component 1202 may include a multimedia module to facilitate the interaction between the multimedia component 1208 and the processing component 1202.

The memory 1204 is configured to store various types of data to support the operation of the electronic device 1200. Examples of these data include instructions for any application or method operating on the electronic device 1200, e.g., contact data, phone book data, messages, pictures, videos, etc. The memory 1204 may be implemented by any type of volatile or non-volatile storage devices or combinations thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk.

The power component 1206 provides power to various components of the electronic device 1200. The power components 1206 may include a power management system, one or more power, and other components associated with generating, managing, and distributing power to the electronic device 1200.

The multimedia component 1208 includes a screen that provides an output interface between the electronic device 1200 and the user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touch, sliding, and gestures on the touch panel. The touch sensor may not only sense the boundary of a touch or slide action, but also detect the duration and pressure related to the touch or sliding. In some examples, the multimedia component 1208 includes a front camera and/or a rear camera. When the electronic device 1200 is in an operation mode, such as a shooting mode or a video mode, the front camera and/or the rear camera can receive external multimedia data. Each front camera and rear camera can be a fixed optical lens system or have focal length and optical zoom capabilities.

The audio component 1210 is configured to output and/or input audio signals. For example, the audio component 1210 includes a microphone (MIC). When the electronic device 1200 is in an operation mode, such as a call mode, a recording mode, and a voice recognition mode, the microphone is configured to receive external audio signals. The received audio signal may be further stored in the memory 1204 or transmitted via the communication component 1216. In some examples, the audio component 1210 further includes a speaker for outputting audio signals.

The I/O interface 1212 provides an interface between the processing component 1202 and a peripheral interface module. The peripheral interface module may be a keyboard, a click wheel, a button, etc. These buttons may include but are not limited to home button, volume button, start button, and lock button.

The sensor component 1214 includes one or more components of the above-mentioned optical imaging module and one or more sensors for providing the electronic device 1200 with status assessment in various aspects. For example, the sensor component 1214 may detect the on/off status of the electronic device 1200 and the relative positioning of components. For example, the component is the display and the keypad of the electronic device 1200. The sensor component 1214 may also detect the position change of the electronic device 1200 or a component of the electronic device 1200, the presence or absence of contact between the user and the electronic device 1200, the orientation or acceleration/deceleration of the electronic device 1200, and the temperature change of the electronic device 1200. The sensor component 1214 may include a proximity sensor configured to detect the presence of nearby objects without physical contact. The sensor component 1214 may also include a light sensor, such as a CMOS or CCD image sensor, for imaging applications. In some examples, the sensor component 1214 may also include an acceleration sensor, a gyroscope sensor, a magnetic sensor, a pressure sensor or a temperature sensor.

The communication component 1216 is configured to facilitate wired or wireless communication between the electronic device 1200 and other devices. The electronic device 1200 may access a wireless network based on a communication standard, such as WiFi, 2G, or 6G, or a combination thereof. In an example, the communication component 1216 receives a broadcast signal or broadcast related information from an external broadcast management system via a broadcast channel. In an example, the communication component 126 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an example, the electronic device 1200 may be implemented by one or more application specific integrated circuits (ASIC), digital signal processors (DSP), digital signal processing devices (DSPD), programmable logic devices (PLD), field-programmable gate array (FPGA), controller, microcontroller, microprocessor, or other electronic components.

In an example, a non-transitory computer-readable storage medium having stored therein instructions is also provided, such as a memory 1204 including instructions. For example, the non-transitory computer-readable storage medium may be ROM, random access memory (RAM), CD-ROM, magnetic tape, floppy disk, optical data storage device, etc.

Other examples of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. An optical imaging module, comprising:
a first lens group arranged in a direction of an optical axis, having a positive refractive power and comprising:
a first lens, having a positive refractive power and comprising a convex object-side surface and a convex image-side surface; and
a second lens, having a negative refractive power,
the first lens and the second lens being arranged in sequence from an object side to an imaging surface; and
a second lens group arranged in the direction of the optical axis, and comprising:
a plurality of lenses with refractive power, comprising at least one movable lens configured to focus on objects to be photographed at different distances by moving along the optical axis;
wherein the first lens group and the second lens group are arranged in sequence from the object side to the imaging surface,
the second lens group has a negative refractive power, and the first lens is a lens closest to the object side,
wherein the plurality of lenses with refractive power comprise a third lens, a fourth lens and a fifth lens, arranged in sequence from the object side to the imaging surface, and at least one of the third lens, the fourth lens or the fifth lens is movable, wherein:
the third lens has a negative refractive power, and comprises a concave image-side surface, the fourth lens has a positive refractive power, and comprises a concave object-side surface and a convex image-side surface, and the fifth lens has a negative refractive power, and comprises a concave object-side surface; or
the third lens has a positive refractive power, the fourth lens has a negative refractive power, and comprises a concave image-side surface, and the fifth lens has a positive refractive power, and comprises a convex object-side surface.

2. The optical imaging module according to claim 1, further comprising:
an aperture diaphragm, located between the second lens and the second lens group, and configured to define an aperture of a central chief ray,
wherein a relationship between a distance $L_s$ from the aperture diaphragm to the imaging surface and a distance TTL from the first lens to the imaging surface is:

$$L_s/TTL<0.9.$$

3. The optical imaging module according to claim 1, further comprising:
a field diaphragm, located at an object side of the first lens and configured to limit an incident amount of marginal rays.

4. The optical imaging module according to claim 1, wherein
an Abbe number Vd1 of the first lens is greater than 30; and
an Abbe number Vd2 of the second lens is less than 40.

5. The optical imaging module according to claim 1, wherein a relationship between an overall focal length f of the optical imaging module and a focal length $f_1$ of the first lens is: $2<f/f_1<10$.

6. The optical imaging module according to claim 1, wherein a relationship between IH that is a half of a diagonal length of an effective sensing area of the imaging surface and a distance TTL from the first lens to the imaging surface is: $2.2<TTL/IH<10$.

7. The optical imaging module according to claim 1, wherein the second lens group comprises a plurality of movable lenses, and a relationship between an overall focal length f of the optical imaging module and a combined focal length $f_m$ of the plurality of movable lenses is: $0.1<|f_m/f|<3$.

8. The optical imaging module according to claim 1, wherein the optical imaging module meets at least one of following relationships:
  a relationship between a focal length $f_1$ of the first lens and a focal length $f_3$ of the third lens is: $1<|f_3/f_1|<5$;
  a relationship between an overall focal length f of the optical imaging module and the focal length $f_3$ of the third lens is: $0.5<|f/f_3|<3$;
  a relationship between the overall focal length f of the optical imaging module and a focal length $f_4$ of the fourth lens is: $0<|f/f_4|<6$; or,
  a relationship between the overall focal length f of the optical imaging module and a focal length $f_5$ of the fifth lens is: $0<|f/f_5|<5$.

9. The optical imaging module according to claim 1, wherein a relationship between a radius of curvature $R_1$ of the object-side surface of the first lens and a radius of curvature $R_2$ of the image-side surface of the first lens is: $-5<R_1/R_2<0$.

10. The optical imaging module according to claim 1, wherein a relationship between a radius of curvature $R_3$ of an object-side surface of the second lens and a radius of curvature $R_4$ of an image-side surface of the second lens is: $-10<(R_2+R_4)/(R_2-R_4)<5$.

11. The optical imaging module according to claim 1, wherein a relationship between a radius of curvature $R_5$ of an object-side surface of the third lens and a radius of curvature $R_6$ of an image-side surface of the third lens is: $1<|f/|R_5+f/|R_6|<15$;
  wherein f is an overall focal length of the optical imaging module.

12. The optical imaging module according to claim 1, wherein a relationship between a radius of curvature $R_7$ of an object-side surface of the fourth lens and a radius of curvature $R_8$ of an image-side surface of the fourth lens is: $-2<R_7/R_8<10$.

13. The optical imaging module according to claim 1, wherein a relationship between a distance $T_d$ from a vertex of the object-side surface of the first lens to a vertex of an image-side surface of the fifth lens and a distance TTL from the vertex of the object-side surface of the first lens to the imaging surface is: $0.4<T_d/TTL<1$.

14. The optical imaging module according to claim 1, wherein the fifth lens has a refractive index N5 less than 1.8.

15. The optical imaging module according to claim 1, wherein a relationship between an overall focal length f of the optical imaging module and an incident pupil diameter $D_{enp}$ of the optical imaging module is: $f/D_{enp}>2$.

16. An optical imaging device, comprising the optical imaging module according to claim 1, wherein an image sensor component is disposed at an imaging surface of the optical imaging module.

17. An electronic device, comprising the optical imaging device of claim 16.

* * * * *